US011216776B2

(12) United States Patent
Bedford

(10) Patent No.: US 11,216,776 B2
(45) Date of Patent: Jan. 4, 2022

(54) SYSTEM, METHOD AND DEVICE FOR PROCESSING A TRANSACTION

(71) Applicant: Charles Christian Bedford, Yonkers, NY (US)

(72) Inventor: Charles Christian Bedford, Yonkers, NY (US)

( * ) Notice: Subject to any disclaimer, the term of this patent is extended or adjusted under 35 U.S.C. 154(b) by 266 days.

(21) Appl. No.: 15/736,772

(22) PCT Filed: Jun. 23, 2016

(86) PCT No.: PCT/ZA2016/000016
§ 371 (c)(1),
(2) Date: Dec. 14, 2017

(87) PCT Pub. No.: WO2016/210455
PCT Pub. Date: Dec. 29, 2016

(65) Prior Publication Data
US 2018/0357596 A1    Dec. 13, 2018

(30) Foreign Application Priority Data

Jun. 26, 2015 (ZA) .................................. 2015/04635

(51) Int. Cl.
*G06Q 10/08* (2012.01)
*G06Q 20/20* (2012.01)
(Continued)

(52) U.S. Cl.
CPC .......... *G06Q 10/087* (2013.01); *G06F 21/32* (2013.01); *G06Q 10/06* (2013.01); *G06Q 20/203* (2013.01)

(58) Field of Classification Search
CPC ..... G06Q 10/087; G06Q 10/06; G06Q 20/203
(Continued)

(56) References Cited

U.S. PATENT DOCUMENTS

| 7,124,941 | B1 * | 10/2006 | O'Connell | G06Q 10/087 235/385 |
| 7,518,511 | B1 * | 4/2009 | Panj | G06Q 10/08 340/572.1 |
| 2004/0046020 | A1 * | 3/2004 | Andreasson | A61J 1/14 235/385 |

(Continued)

OTHER PUBLICATIONS

"Ownership—But Not Physical Movement—of Selected Drugs Can Be Traced Through the Supply Chain", https://oig.hhs.gov/oei/reports/oei-05-17-00460.asp?utm_source=web&utm_me, retrieved Sep. 4, 2020.

(Continued)

*Primary Examiner* — Florian M Zeender
*Assistant Examiner* — Christopher R Buchanan
(74) *Attorney, Agent, or Firm* — Ira Stickler, Esq.

(57) ABSTRACT

System (10), method and device (12) for processing a transaction, particularly for supply chain management, more particularly for managing the supply chain of goods, for example, pharmaceutical products. The method for processing a supply chain transaction via a transaction device (12) includes the steps of: obtaining an identifier of an operator handling a product; authenticating at least the operator; obtaining an identifier of the product using a product identifying component associated with the transaction device (12); and updating a record to associate the identifier of the operator with the identifier of the product and optionally additional information. The method further requires that i) the product identifying component (26) is activated post operator authentication; and/or ii) at least the identifier of the operator and the identifier of the product are obtainable within a predefined transaction time interval, outside of which the transaction is operably cancelled.

19 Claims, 30 Drawing Sheets

(51) Int. Cl.
 *G06Q 10/06* (2012.01)
 *G06F 21/32* (2013.01)
(58) Field of Classification Search
 USPC .................................................. 705/28, 22
 See application file for complete search history.

(56) References Cited

U.S. PATENT DOCUMENTS

| | | | | |
|---|---|---|---|---|
| 2007/0250411 | A1* | 10/2007 | Williams | G06Q 10/087 |
| | | | | 705/28 |
| 2009/0037244 | A1* | 2/2009 | Pemberton | G06Q 10/087 |
| | | | | 705/28 |
| 2010/0017023 | A1* | 1/2010 | Jacomet | G07F 9/026 |
| | | | | 700/236 |
| 2012/0310669 | A1* | 12/2012 | Carlberg | G16H 10/60 |
| | | | | 705/3 |
| 2013/0231954 | A1* | 9/2013 | Bryant | G06F 21/32 |
| | | | | 705/3 |
| 2014/0254865 | A1* | 9/2014 | Soubra | G06K 9/00624 |
| | | | | 382/103 |
| 2015/0354949 | A1* | 12/2015 | Lecky | G06F 3/017 |
| | | | | 702/150 |

OTHER PUBLICATIONS

Murrin, Deputy Inspector General for Evaluation and Inspections, "Ownership—But Not Physical Movement—of Selected Drugs Can Be Traced Through the Supply Chain", US Dept of Health and Human Services, Office of Inspector General, OEI-05-17-00460, Feb. 2020.

* cited by examiner

Supply Chain Data Table Example of Product A based on Figure 8a

| Supply Chain | Seeker / Supplier | User | Position | Date & Time |
|---|---|---|---|---|
| Manufacturer | Supplier | M Black | Warehouse Controller | 01 May 2015 11:15am |
| Distributor | Seeker | D Green | Goods Receiving Controller | 07 May 2015 09:00am |
| Distributor | Supplier | D White | Warehouse Controller | 15 June 2015 02:00pm |
| Wholesaler | Seeker | W Brown | Goods Receiving Controller | 16 June 2015 10:45am |
| Wholesaler | Supplier | W Grey | Warehouse Controller | 24 June 2015 11:00am |
| Retailer | Seeker | R Black | Goods Receiving Controller | 27 June 2015 04:00pm |

Figure 11A

Supply Chain Data Table Example of Product A based on Figure 8a for Pharmaceuticals

| Supply Chain | Seeker / Supplier | User | Position | Date & Time |
|---|---|---|---|---|
| Manufacturer | Supplier | M Black | Warehouse Controller | 01 May 2015 11:15am |
| Distributor | Seeker | D Green | Goods Receiving Controller | 07 May 2015 09:00am |
| Distributor | Supplier | D White | Warehouse Controller | 15 June 2015 02:00pm |
| Wholesaler | Seeker | W Brown | Goods Receiving Controller | 16 June 2015 10:45am |
| Wholesaler | Supplier | W Grey | Warehouse Controller | 24 June 2015 11:00am |
| Retailer | Seeker | R Black | Goods Receiving Controller | 27 June 2015 04:00pm |
| Retailer | Supplier | R White | Warehouse Controller | 13 July 2015 09:30am |
| End User (Health Facility) | Seeker | H Grey | Health Facility Stock Controller | 15 July 2015 03:00pm |

Figure 11B

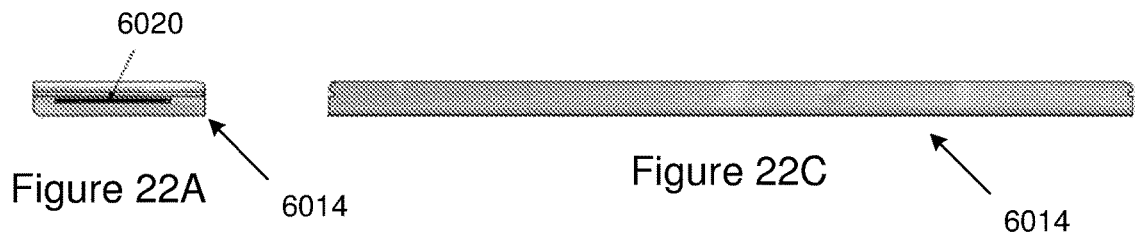
Figure 22A
Figure 22C
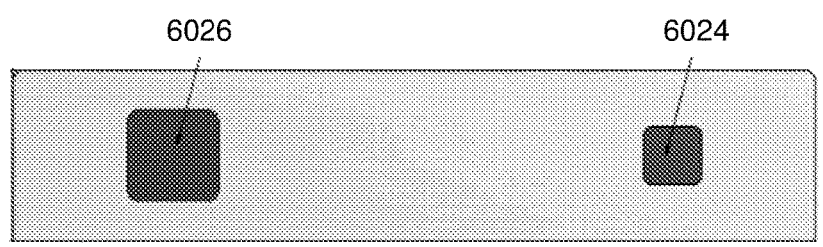
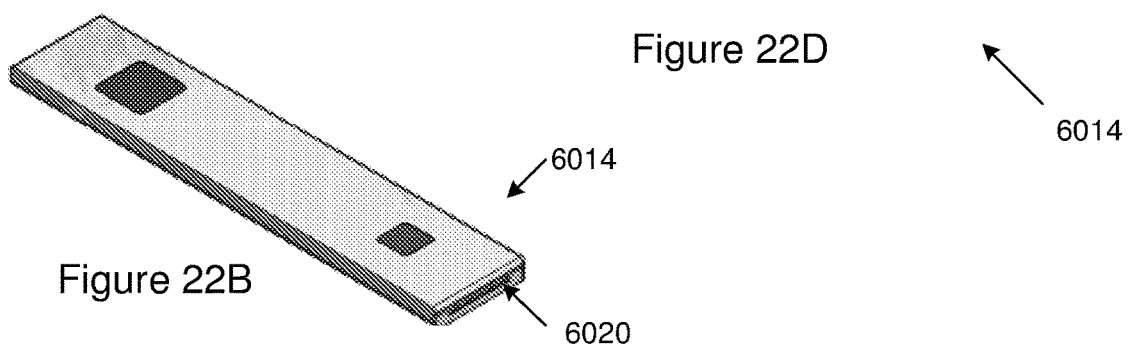
Figure 22B
Figure 22D
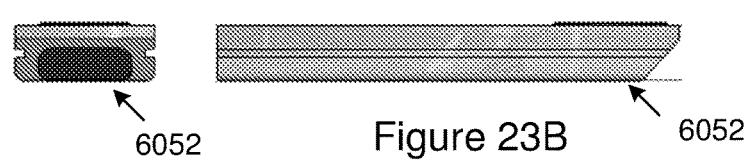
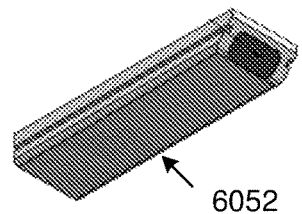
Figure 23A   Figure 23B
Figure 23C
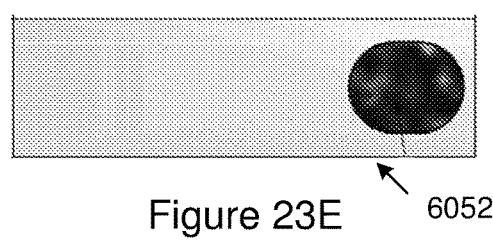
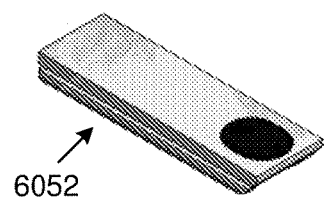
Figure 23E
Figure 23D

SYSTEM, METHOD AND DEVICE FOR PROCESSING A TRANSACTION

FIELD OF THE INVENTION

This invention relates to a system, method and device for processing a transaction, particularly for supply chain management, more particularly for managing the supply chain of goods, for example, pharmaceutical products.

BACKGROUND TO THE INVENTION

The term supply chain generally refers to a system of entities, people, activities, information, and/or resources involved in moving a product from a supplier to an end-operator. Supply chain activities may involve the transformation of natural resources, raw materials, and components into a finished product that is delivered to the end-user.

Presently, the complexity of supply chains is increasing as, for example, companies outsource more aspects of their business to globally distributed supplier networks. Due to the number of different third parties involved in a supply chain, each with their own systems in place, it can be difficult for a product or resource to be reliably tracked as it moves from one stage in the supply chain to another.

There is accordingly a need for a technology which alleviates these and/or other difficulties. Although the invention is primarily aimed at supply chain management applications, it is envisaged that the invention may be applied to many other applications, for example, point of sale (POS) applications.

SUMMARY OF THE INVENTION

In accordance with a first aspect of the invention, there is provided a method for processing a transaction via a transaction device including the steps of:
(A) obtaining an identifier of an operator handling a product;
(B) authenticating at least the operator;
(C) obtaining an identifier of the product using a product identifying component associated with the transaction device; and
(D) updating a record to associate the identifier of the operator with the identifier of the product and optionally additional information;
wherein:
(i) the product identifying component is activated post operator authentication; and/or
(ii) at least the identifier of the operator and the identifier of the product are obtainable within a predefined transaction time interval, outside of which the transaction is operably cancelled.

A further feature provides for updating a record to include storing one or more of the identifier of the operator, the identifier of the product and additional information in one or both of a digital storage of the transaction device and a credential storage device.

A still further feature provides for the method to include a step of transmitting data including one or more of the identifier of the operator, the identifier of the product and additional information to a third party server computer for storage thereat.

Typically, the step of transmitting data includes a step of encrypting such information.

A yet further feature provides for obtaining an identifier of an operator to include obtaining an identifier from a credential storage device of the operator.

A further feature provides for authenticating the operator to include obtaining biometric information from the operator and comparing the obtained biometric information to biometric information stored on one or both of the transaction device and the credential storage device.

A still further feature provides for the operator to be a supplier of the product and for the method to include steps of: obtaining an identifier of a recipient of the product; and, authenticating the recipient.

A yet further feature provides for the timed step of obtaining the identifiers of the supplier and the product including the further step of obtaining within the predefined transaction time interval the identifier of the recipient.

A further feature provides for the timed step to also include obtaining an identifier of a transaction device. The transaction device identifier may be a unique number associated to such transaction device and/or a specific location of such transaction device, i.e. the GPS coordinate at which the transaction device is located at the time of processing the transaction.

Generally, the timed step is timed by a timing means of the transaction device, one or other of the credential storage devices and/or the server computers.

Yet further features provide for the step of obtaining an identifier of a recipient to include obtaining an identifier from a credential storage device of the recipient; and for the step of authenticating the recipient to include obtaining biometric information from the recipient and comparing the obtained biometric information to biometric information stored on the credential storage device of the recipient.

A still further feature provides for the step of obtaining an identifier of a transaction device to include obtaining an identifier from a credential storage device of the transaction devices; and for a step of authenticating the transaction device to include comparing the obtained transaction device identifier of a transaction device information stored on the credential storage device of the transaction devices.

A yet further feature provides for updating a record to include associating the identifier of the product with identifiers of the supplier, the recipient and/or the transaction device.

An even further feature provides for updating a record to include associating the identifier of the product with a status from a group of statuses including: product received; product dispensed; product sold; product returned; etc.

Another feature provides for the step of obtaining an identifier of the product to include a step of authenticating the identifier of the product. In the event of the identifier of the product failing authentication, the transaction is operably cancelled with the product being flagged or remove. The aim of this step is to eradicate non-genuine products.

Yet a further feature provides for associating a successful transaction with the identifier of a product such that, a downstream transaction is allowable only on the successful completion of an upstream transaction.

A further feature provides for the method to include receiving diagnostic information relating to the recipient.

A still further feature provides for the diagnostic information to be input by the operator and for the received diagnostic information to be stored on the credential storage device of the recipient.

A yet further feature provides for the diagnostic information to be received from a credential storage device of the recipient.

A further feature provides for the method to include:
based on the received diagnostic information, identifying a product to be provided to the recipient; and
responsive to identifying the product, granting permission for release of the identified product.

A still further feature provides for the method to include:
determining whether the identified product is available; and
if the identified product is available, granting permission for release of the identified product, and
if the identified product is not available, identifying an alternative operator able to release the identified product.

Further features provide for the additional information to include one or more of: biometric information of the operator, supplier and/or the recipient; a time at which the identifier of the product was obtained; a time at which the identifier of the operator, supplier and/or the recipient was obtained; diagnostic information; and, a time at which the operator, supplier and/or the recipient was authenticated.

Even further features provide for the additional information to also include one or more of: the date and time of concluding the transaction; and the monetary amount associated with the transaction.

It will be appreciated that although the method may be applied to processing any number of transactions, including point of sales transactions, the method is primarily aimed at a method for managing the transactions within a supply chain, with the transaction device being a supply chain management device at each stage of a supply chain.

In accordance with a second aspect of the invention, there is provided a method for processing transactions, the method conducted at a central server computer in communication with a number of third party server computers, comprising:
(A) receiving, from each third party server computer as a product moves from one person or entity to another, data associated with the product, the data having been received at each third party server computer from a transaction device operated by an operator handling the product, the transaction device having: obtained an identifier of the operator; authenticated the operator; and obtained a product identifier of the product, wherein:
  (i) obtainment of the product identifier occurs post authentication of the operator; and/or
  (ii) at least the identifier of the operator and the identifier of the product are obtainable within a predefined transaction time interval, outside of which the transaction is operably cancelled.
(B) updating a record to associate the identifier of the operator and optionally additional information with the identifier of the product.

Generally, the method is a method for managing a supply chain, wherein each of the third party server computers relates to a different stage of the supply chain.

Typically, the step of receiving data associated with the product is received from each third party server computer as a product moves from one stage in the supply chain to another.

Preferably, the step of updating a record occurs at each stage of the supply chain.

Another feature provides for the step of obtaining an identifier of the product to include a step of authenticating the identifier of the product.

Further features provide for the additional information to include one or more of: biometric information of the operator, a supplier and/or a recipient; a time at which the identifier of the product was obtained; a time at which an identifier of the operator, supplier and/or the recipient was obtained; diagnostic information; and, a time at which the operator, a supplier and/or a recipient was authenticated.

Even further features provide for the additional information to also include one or more of: the date and time of concluding the transaction; and the monetary amount associated with the transaction.

In accordance with a third aspect of the invention, there is provided a system for processing a transaction, the system including a transaction device comprising:
an operator identifying module for obtaining an identifier of an operator handling a product;
an authentication component for authenticating the operator;
a product identifying component for obtaining an identifier of the product using the product identifying component;
a record updating component for updating a record to associate the identifier of the operator with the identifier of the product and optionally additional information; and
one or both of:
(i) an activating component for, if the operator is authenticated, activating the product identifying component associated with the device; and
(ii) a timing component for timing a predefined transaction time interval within which at least the identifier of the operator and the identifier of the product must be operatively obtained, and outside of which the transaction is operably cancelled.

Further features provide for the operator identifying module to include a credential storage device receiving module and for obtaining an identifier of an operator to include obtaining an identifier of the operator from a credential storage device of the operator.

A still further feature provides for the authentication component to include a biometric capturing device, and for authenticating the operator to include obtaining biometric information from the operator and comparing the obtained biometric information to biometric information stored on one or both of the transaction device and the credential storage device.

A yet further feature provides for the product identifying component to include one or both of a barcode scanner and a radio-frequency identification (RFID) tag reader.

A further feature provides for the transaction device to include a transmitting component for transmitting data including one or more of the identifier of the operator, the identifier of the product and additional information to a third party server computer for storage thereat.

A still further feature provides for the transmitting component to transmit data via one or more of the group of: a long range wireless area network (LoRAWAN), a satellite communication link; a cellular communication link such as a universal mobile telecommunications system (UMTS) link and/or global system for mobile communications (GSM); a wired local area network; and a wireless local area network.

A yet further feature provides for the system to include a third party server computer including:
a receiving component for receiving data from the transaction device;
a storing component for storing the received data; and
a synchronising component for synchronising the stored data with a central server computer.

Further features provide for the additional information to include one or more of: biometric information of the operator, a supplier and/or a recipient; a time at which the identifier of the product was obtained; a time at which an identifier of the operator, supplier and/or the recipient was obtained; diagnostic information; and, a time at which the operator, a supplier and/or a recipient was authenticated.

Even further features provide for the additional information to also include one or more of: the date and time of concluding the transaction; and the monetary amount associated with the transaction.

Another feature provides for the authentication of the identifier of the product.

It will be appreciated that although the system may be applied to processing any number of transactions, including point of sales transactions, the system is primarily aimed at managing the transactions within a supply chain, with the transaction device being a supply chain management device at each stage of a supply chain.

In accordance with a fourth aspect of the invention, there is provided a system for processing transactions, the system including a central server computer in communication with a number of third party server computers, comprising:

a synchronising component for: receiving, from each third party server computer as a product moves from one person or entity to another, data associated with the product, the data having been received at each third party server computer from a transaction device operated by an operator handling the product, the transaction device having: obtained an identifier of the operator; authenticated the operator; and obtained a product identifier of the product, wherein:
    (i) obtainment of the product identifier occurs post authentication of the operator; and/or
    (ii) at least the identifier of the operator and the identifier of the product are obtainable within a predefined transaction time interval, outside of which the transaction is operably cancelled; and
    updating a record to associate the identifier of the operator and optionally additional information with the identifier of the product.

Generally, the system is for managing a supply chain, wherein each of the third party server computers relates to a different stage of the supply chain.

Typically, the receiving of data associated with the product is received from each third party server computer as a product moves from one stage in the supply chain to another.

Preferably, the updating a record occurs at each stage of the supply chain.

Another feature provides for the authentication of the identifier of the product.

Further features provide for the additional information to include one or more of: biometric information of the operator, a supplier and/or a recipient; a time at which the identifier of the product was obtained; a time at which an identifier of the operator, supplier and/or the recipient was obtained; diagnostic information; and, a time at which the operator, a supplier and/or a recipient was authenticated.

Even further features provide for the additional information to also include one or more of: the date and time of concluding the transaction; and the monetary amount associated with the transaction.

In accordance with a fifth aspect of the invention, there is provided a transaction device including:
    an operator identifying module for obtaining an identifier of an operator handling a product;
    a product identifying component for obtaining an identifier of the product using the product identifying component;
    a communications module for transmitting and receiving data for at least the purposes of authenticating the operator; and
    one or both of:
    (i) an activating component for, post authentication of the operator, activating the product identifying component associated with the device; and
    (ii) a timing component for timing a predefined transaction time interval within which at least the identifier of the operator and the identifier of the product must be operatively obtained, and outside of which the transaction is operably cancelled.

The operator identifying module may be at least one biometric scanner for scanning a biometric of the operator, which operator may be one or both of a supplier and a recipient. Preferably, the transaction device includes two biometric scanners.

Generally, the transaction device includes at least one secondary operator identifying module for obtaining a secondary identifier of an operator.

In one embodiment, the secondary operator identifying module may be a user input for inputting a unique supplier PIN and a unique recipient PIN. In an alternative embodiment, the secondary operator identifying module may be a card reader or a RFID tag reader. Preferably, the secondary operator identifying module is a pair of card readers, each configured to receive an identification card of either the supplier or the recipient.

Typically, the product identifying component includes one or both of a barcode scanner and a RFID tag reader.

The communications module may be integrated or capable of being integrated with a means of encryption thereby to encrypt some or all of the data being transmitted from and/or received by the communications module. Generally, the communications module is capable of being integrated with an Active Directory (AD) and/or Lightweight Directory Access Protocol (LDAP).

Preferably, and whether for the method, system or device described herein, the predefined transaction time interval is 10 seconds or less. More preferably, the predefined transaction time interval is 5 seconds or less. Most preferably, the predefined transaction time interval is 2 seconds or less. It is even more preferable, that the predefined transaction time interval is near zero such that at least two or more of the identifiers are obtained near simultaneously, forming a "virtual handshake".

The transaction device may include further:
    an authentication component for authenticating the operator and/or the product; and/or
    a record updating component for updating a record to associate the identifier of the operator with the identifier of the product and optionally additional information.

The transaction device may be configured for use in many applications, including use as a point of sales device or a supply chain management device.

BRIEF DESCRIPTION OF THE DRAWINGS

The invention will now be described, by way of example only, with reference to the accompanying representations in which:

FIG. 11A is a table showing exemplary traceable data;

FIG. 11B is a table showing exemplary traceable data for pharmaceuticals;

FIGS. 22A-22D illustrate an exemplary portable device including a biometric capturing device, a credential storage device receiving module and a product identifying component;

FIGS. 23A-23E illustrate an exemplary product identifying device; and,

DETAILED DESCRIPTION WITH REFERENCE TO THE DRAWINGS

Figure 1:
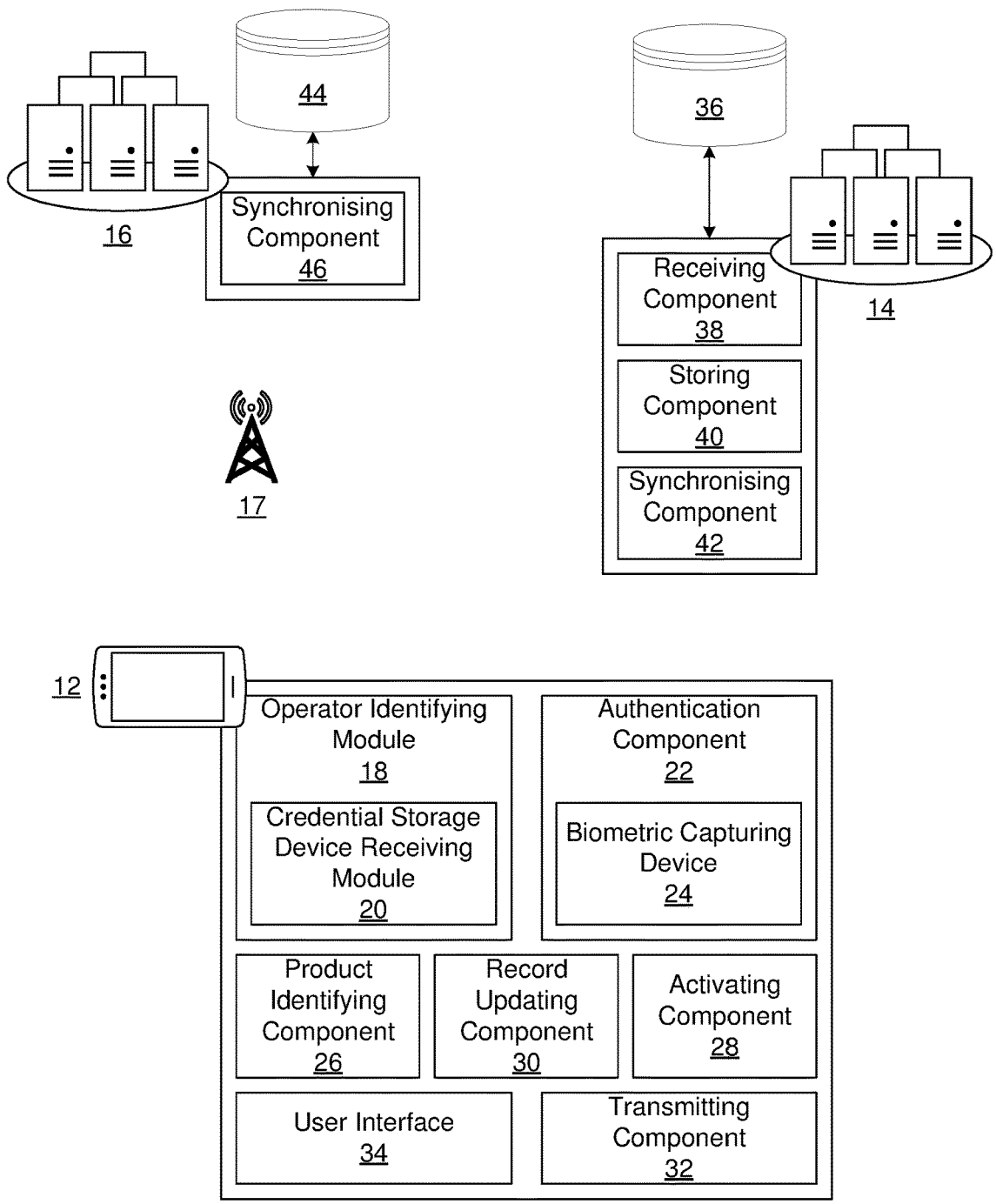
FIG. 1 is a schematic diagram which illustrates an exemplary supply chain management system.

Although the description that follows focuses on the application of the present invention to supply chain management, it will be appreciated that this has been done only to fully describe the invention and win not be construed to limit the invention to this application exclusively. For example, the invention is capable of being applied to many applications, with point of sales application just being one other.

Effective supply chain management may enable a sufficient amount of inventory to make sales to be maintained by a third party, thereby preventing unnecessary storage and wastage expenses. Furthermore, logistics expenses may be reduced due to more efficient distribution systems. Communication channels between recipients and suppliers may be enhanced. Resources, including raw materials, equipment, employees and finances may be more efficiently utilised.

The systems described herein include a central server computer which receives data associated with a product from a number of third party server computers, each of which relates to or is associated with a different stage in a supply chain, as the product moves from one stage in the supply chain to another. The data is received at each third party server computer from a transaction device, more particularly and for the purposes of supply chain management applications a supply chain management device, operated by an operator who handles the product. The supply chain management device obtains an identifier of the operator and, in one embodiment, authenticates the operator prior to obtaining an identifier of the product. The data received at the central server computer from the third party server computers includes the identifier of the operator, the identifier of the product and optionally additional information and is used to update a record to associate, for each stage of the supply chain, the identifier of the operator and optionally additional information with the identifier of the product.

In another embodiment, and either as an alternative or a supplement to authenticating the operator prior to obtaining an identifier of the product, the system is configured to obtain at least the identifier of the operator and the identifier of the product within a predefined transaction time interval, outside of which the transaction is operably cancelled. Although the predefined transaction time interval may typically be any time span of 10 seconds or less, it is preferable that such predefined transaction time interval is very small such that such steps are undertaken near simultaneously thereby to constitute a "virtual handshake".

The systems and methods described herein aim to improve supply chain visibility. This may help to minimize risk of loss, order delays and reduced quality. Collaboration and communication between recipients and suppliers may be improved. Additionally, transparency, traceability, allocation and accountability of resources along the supply chain may be improved so as to enable accurate and timely designation and distribution along the supply chain.

The term "supplier" as used herein should be broadly construed and includes any individual authorised to distribute, dispense, release, deliver or otherwise dispose of or order the disposal of a product. The supplier may represent (e.g. be employed by) a third party organisation or entity which is involved in a product supply chain. Some specific examples of suppliers as anticipated herein include medical practitioners such as doctors who diagnose conditions and prescribe medication based on the diagnosis. A supplier may further include a pharmacist who dispenses a product based on a doctors prescription.

It will be appreciated that a supplier may even further include a retail merchant, for the retail of any product pharmaceutical or otherwise.

The term "recipient" as used herein should be broadly construed and includes any individual authorised to receive, take delivery of or collect a product, or any individual receiving authorisation to receive, take delivery of or collect a product. The recipient may represent (e.g. be employed by) a third party organisation or entity which is involved a product supply chain. A specific example of a recipient as used herein includes a patient who is prescribed certain medication by a medical practitioner and who then seeks the medication from a pharmacist.

It will be appreciated that a recipient may be the ultimate customer in the supply chain, or any intermediate supplier between the first supplier and the ultimate customer.

The term "product" as used herein should be broadly construed and includes any article, commodity, object, product of manufacture, shipment, consignment, container, crate, pallet or the like which moves from control of one individual or entity to control of another individual or entity through a supply chain.

The term "supply chain" as used herein refers to a system of entities, organisations individuals, activities, information, and resources involved in moving a product or service from supplier to end-user.

FIG. 1 is a schematic diagram which illustrates an exemplary supply chain management system (10). The system includes a supply chain management device (12), a third party server computer (14) maintained by third party entity (e.g. a supplier or a recipient entity) involved in one stage of a supply chain and a central server computer (16) maintained by a supply chain management entity. Although only one third party server computer and one supply chain management device are illustrated, it should be appreciated that in a practical implementation there may be one or more of each of these. For example, there may be one third party server and one or more supply chain management devices at each stage in the supply chain. The system (10) includes a communication network (17) via which the supply chain management device (12), third party server computer (14) and central server computer (16) communicate.

The supply chain management device (12) may be any appropriate mobile communication device. In one embodiment, the supply chain management device (12) takes on the form of a portable tablet computer which is able to operate in remote locations. The supply chain management device is operated by an operator who may be an employee or representative of the third party entity. As mentioned above, the third party entity may be any entity along a supply chain who receives and/or disposes of products.

The supply chain management device (12) includes an operator identifying module (18) for obtaining an identifier of the operator. In the illustrated embodiment, the operator identifying module (18) includes a credential storage device receiving module (20) for obtaining an identifier from a credential storage device of the operator. In the illustrated embodiment, the credential storage device is a smartcard (e.g. an ID smartcard) which is configured to store credentials relating to the operator. Credentials stored in the credential storage device include one or more of the group of: the operators name, date of birth, authority level, biometric information, organisational details and the like. The credential storage device receiving module (20) is, in this embodiment, a smartcard reader.

The supply chain management device (12) further includes an authentication component (22) for authenticating the operator. The authentication component (22) includes, in this exemplary embodiment, a biometric capturing device (24) for obtaining biometric information from the operator and comparing the obtained biometric information to biometric information stored on one or both of the supply chain management device (12) and the credential storage device. The biometric capturing device may be one or more of the group of: a fingerprint scanner, a finger vein scanner, a retina scanner, a microphone for performing voice recognition, a high resolution camera for performing facial recognition, a means for measuring electrophysiological signals (i.e. an electrocardiography device (ECG) or an electroencephalogram device (EEG)), a means for distinguishing humans from microbial, bacterial and/or DNA markers, and the like.

The supply chain management device (12) is associated with a product identifying component (26) and includes an activating component (28) for, if the operator is authenticated, activating the product identifying component (26). In this manner, the identifier of a product cannot be obtained if the operator has not been authenticated. The product identifying component is operable to obtain an identifier of a product and may include one or both of a barcode scanner and a radio-frequency identification (RFID) tag reader. The product identifier may be a unique number, an optical machine readable identifier such as a barcode (e.g. linear barcode, two dimensional barcode or the like), an RFID tag, or any other appropriate identifier.

As previously described, and either as an alternative or a supplement to authenticating the operator prior to obtaining an identifier of the product, the device may include a timing component for timing a predefined transaction time interval during which at least the identifier of the operator and the identifier of the product must be obtained. If such identifiers are not obtained within such predefined transaction time interval, the transaction is operably cancelled.

Furthermore, the step of obtaining an identifier of the product should further include a step of authenticating the identifier of the product. In the event of the identifier of the product failing authentication, the transaction is operably cancelled with the product being flagged or remove.

In the illustrated embodiment, the supply chain management device (12) includes a record updating component (30) for updating a record to associate the identifier of the operator with the identifier of the product and optionally additional information. The record updating component (30) is operable to store one or more of the identifier of the operator, the identifier of the product and additional information in one or both of a digital storage of the supply chain management device (12) and a credential storage device. The additional information includes one or more of: biometric information of the operator (e.g. supplier and/or recipient); a time at which the identifier of the product was obtained; a time at which the identifier of the operator (e.g. supplier and/or recipient) was obtained; diagnostic information; and, a time at which the operator (e.g. supplier and/or recipient) was authenticated. In some embodiments, the record updating component (30) updates a record maintained remotely by a cloud-based server computer (e.g. a cloud-based record).

It will be appreciated that for point of sales applications, it would be useful for the additional information to also include, for example, the date and time of concluding the transaction and the monetary amount associated with the transaction.

Furthermore, in the illustrated embodiment, the supply chain management device (12) includes a transmitting component (32) for transmitting data including one or more of the identifier of the operator, the identifier of the product and additional information to the third party server computer (14) for storage thereat. The transmitting component (32) is operable to transmit data via one or more of the group of: a long range wireless area network (LoRAWAN), a satellite communication link; a cellular communication link such as a universal mobile telecommunications system (UMTS) link (e.g. 3G, 4G, LTE, etc.) and/or global system for mobile communications (GSM); a wired local area network; and a wireless local area network (e.g. Wi-Fi). In this manner, the supply chain management device may be operable in remote areas, even outside of the range of terrestrial-based communication networks.

The supply chain management device (12) also includes a user interface (34) via which the operator (e.g. a supplier or recipient) may interface with the device (12). The user interface (34) is operable to receive operator input in the form of controls, instructions and/or information. The user interface, in one embodiment, is operable to receive diagnostic information relating to a medical (or other) condition of a recipient. The user interface is also operable to output data and/or information to the operator. In this exemplary embodiment, the user interface (34) includes a touch-sensitive display screen for input and output.

The third party server computer (14) is any appropriate server computer and has access to a database (36). The third party server computer (14) includes a receiving component (38) for receiving data from the supply chain management device (12) and a storing component (40) for storing the received data in the database (36). Storing the received data may include updating various inventory lists so as to indicate, for example, whether a product which was in possession of the operator has been dispensed or dispatched or is counterfeit/unidentifiable or, conversely, whether a product has been received and must now be included in the inventory. The third party server computer (14) further includes a synchronising component (42) for synchronising the stored data with the central server computer (16) maintained by the supply chain management entity.

The central server computer (16) is any appropriate server computer and has access to a database (44). The central server computer (16) includes a synchronising component (46) for synchronising with the third party server computer (14). The synchronising component (46) updates a record in the database (44) to associate, for each stage of the supply chain, the identifier of the operator and optionally additional information with the identifier of the product.

Thus, a product may be tracked by the central server computer (16) as it moves through a supply chain. For each stage at the supply chain, the product is associated with an operator handling the product, the operator having been securing identified and authenticated prior to the product identifier being obtained. In this manner, transparency, traceability, allocation and accountability of the product along the supply chain may be monitored and managed so as to enable accurate and timely designation and distribution of the product along the supply chain.

In some embodiments, the biometric capturing device (24), credential storage device receiving module (20) and a product identifying component (26) are provided by a separate portable device which is detachable from the supply chain management device (12). Furthermore, some embodiments anticipate the transmitting component (32) being provided in the form of a portable modem detachable from the supply chain management device (12). The supply chain management device (12) may further include a portable electronic device and a further, portable product identifying device which may be detachable from the supply chain management device.

To further authenticate the delivery of the product through the supply chain, the device includes a device identifier in the form of a unique number associated to such supply chain management device and/or a specific location of such device, i.e. the GPS co-ordinate at which the transaction device is located at the time of processing the transaction. It will be appreciate that this identifier is similarly record against one or more of the operator or product identifiers.

Figure 2:
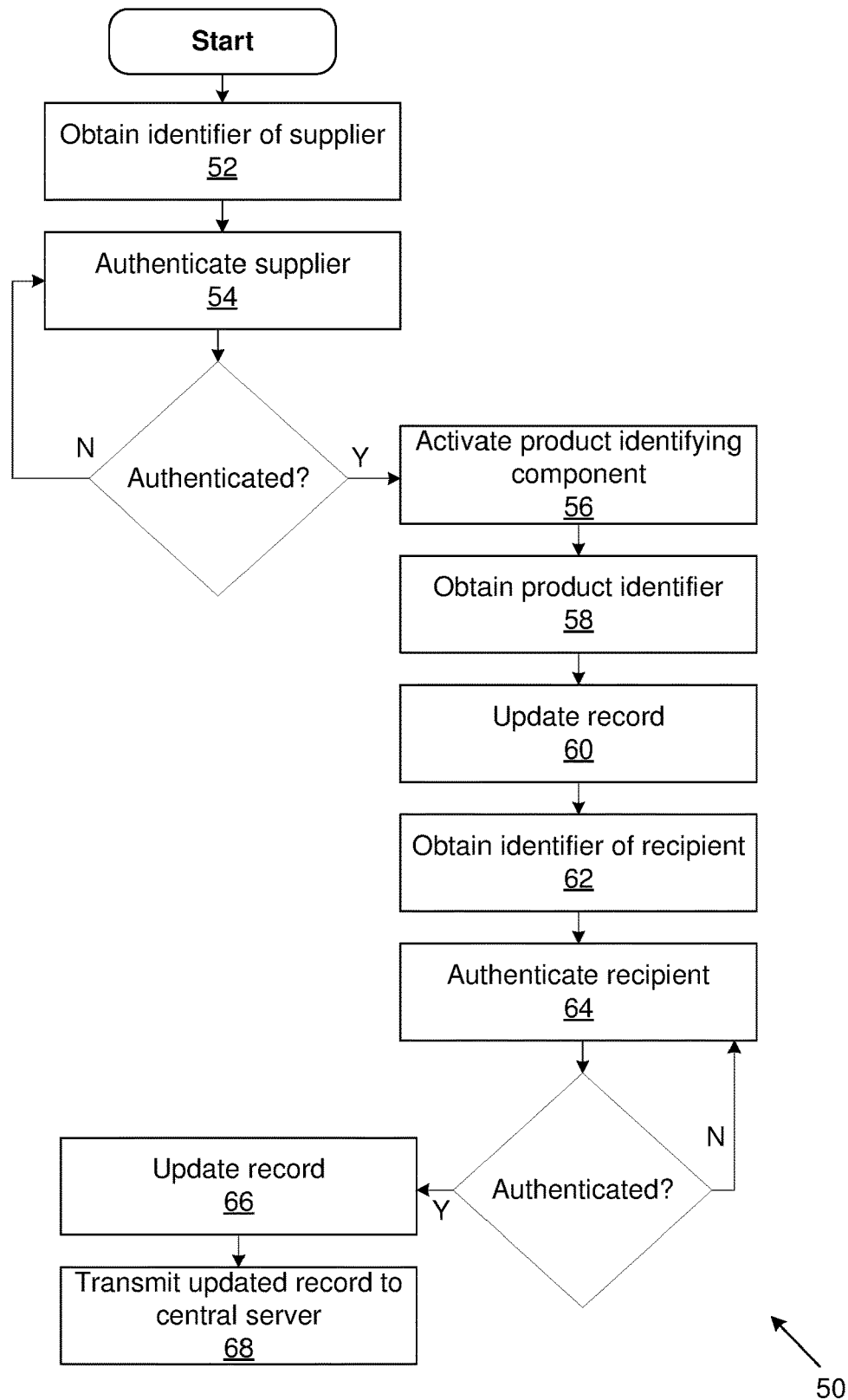
FIG. 2 is a flow diagram which illustrates an exemplary method for managing a supply chain.

Reference is now made to FIG. 2, in which an exemplary method (50) for managing a supply chain is illustrated. The method (50) may be implemented by a supply chain management system as described herein.

At a first stage (52), an identifier of an operator is obtained from, in this exemplary embodiment, a credential storage device (e.g. an ID smartcard) of the operator.

At a next stage (54), the operator is authenticated. Authenticating the operator includes obtaining biometric information (e.g. a fingerprint or retina image) from the operator and comparing the obtained biometric information to biometric information stored on one or both of a supply chain management device and the credential storage device.

At a following stage (56), if the operator is authenticated, a product identifying component (e.g. a barcode scanner) associated with the device is activated and, at a further stage (58), an identifier of a product is obtained using the product identifying component (e.g. by scanning a barcode displayed on the product).

As an alternative or a supplement to authenticating the operator prior to obtaining an identifier of the product, the method may include a timing means for timing a predefined transaction time interval during which at least the identifier of the operator and the identifier of the product must be obtained. If such identifiers are not obtained within such predefined transaction time interval, the transaction is operably cancelled.

A record is then updated at a following stage (60) so as to associate the identifier of the operator with the identifier of the product and optionally additional information. Updating the record includes storing one or more of the identifier of the operator, the identifier of the product and additional information in one or both of a digital storage of the supply management device and a credential storage device. The additional information may include one or more of: biometric information of the operator; a time at which the identifier of the product was obtained; a time at which the identifier of the operator was obtained; and, a time at which the operator was authenticated.

For point of sales applications, it will be appreciated that the additional information could also include, for example, the date and time of concluding the transaction and the monetary amount associated with the transaction.

Updating a record may further include associating the identifier of the product with a status including, for example that the product has been dispensed. In this manner, a product is linked to an operator having handled the product at each stage in the supply chain. Furthermore, the operator is authenticated by providing biometric information meaning that the product can be accurately tracked as it moves through the supply chain.

In some embodiments, the operator is a supplier and, at a following stage (62), an identifier of a recipient is obtained from, for example, a credential storage device of the recipient (e.g. the recipients ID smartcard).

The recipient is authenticated at a next stage (64), for example, by obtaining biometric information from the recipient and comparing the obtained biometric information to biometric information stored on the stored on the credential storage device of the recipient.

At a further stage (66), the record is updated so as to associate the identifier of the recipient and optionally additional information with the identifier of the product. The stage (66) of updating the record may include storing one or more of the identifier of the supplier, the identifier of the recipient, the identifier of the product and additional information in one or more of a digital storage of the device, the credential storage device of the supplier and the credential storage device of the recipient. Preferably, at least some or ail of the identifiers, including the identifier of the supply chain management device, are obtained within the predefined transaction time interval.

The additional information may further include biometric information of the recipient; a time at which the identifier of the recipient was obtained; and, a time at which the recipient was authenticated. Updating the record may further include associating the identifier of the product with a status including, for example that the product has been received. Thereafter, the product may be dispensed from the supplier to the recipient.

At a later stage (68), data including the updated record is transmitted to a third party server computer for storage thereat.

Figure 3:
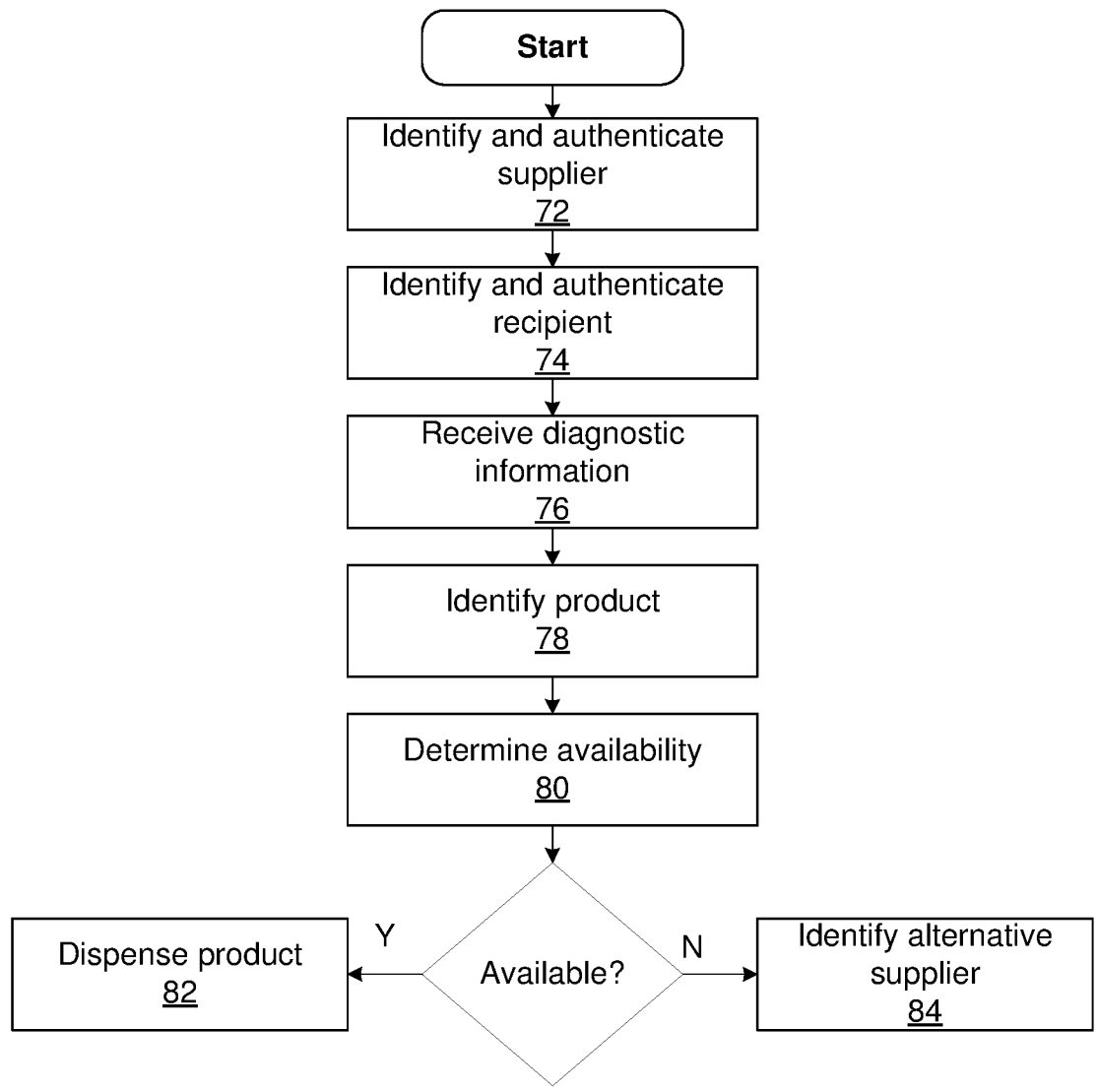
FIG. 3 is a flow diagram which illustrates another exemplary method for managing a supply chain.

FIG. 3 is a flow diagram which illustrates a method (70) for managing a supply chain. The method (70) may be implemented by a supply chain management system and includes an initial stage (72) of obtaining an identifier of an operator, in this case being a supplier, and authenticating the supplier.

At a following stage (74), an identifier of a recipient is obtained and the recipient is authenticated.

At a next stage (76), diagnostic information relating to a recipient is received. In one case, the diagnostic information may be received as an input from the supplier. For example, the supplier may be a medical practitioner who performs medical tests on a recipient and in doing so diagnoses a condition with which the recipient is suffering. The medical practitioner may then input the diagnostic information into a supply chain management device of the supply chain management system. In another case, the diagnostic information may be received from a credential storage device of the recipient. For example, the recipient may have previously been diagnosed with a condition and diagnostic information relating thereto having been stored on the recipient's credential storage device.

At a following stage (78), based on the received diagnostic information, a product to be provided to the recipient is identified. The product may be identified as being, for example, a suitable medicament to be taken in order to treat the condition with which the recipient has been diagnosed.

In some embodiments, at a further stage (80), the availability of the relevant product may be determined and, if the identified product is available, permission for release of the identified product may be granted at a next stage (82) such that the recipient can take delivery of the product there and then. If the identified product is not available, an alternative supplier able to release the identified product is identified at a further stage (84). In some cases, permission may be granted for release of the product and stored in the credential storage device of the recipient, along with an identifier of the product and any appropriate additional information, such that the recipient may visit the alternative supplier (e.g. a pharmacist) in order to obtain the product.

Figure 4:
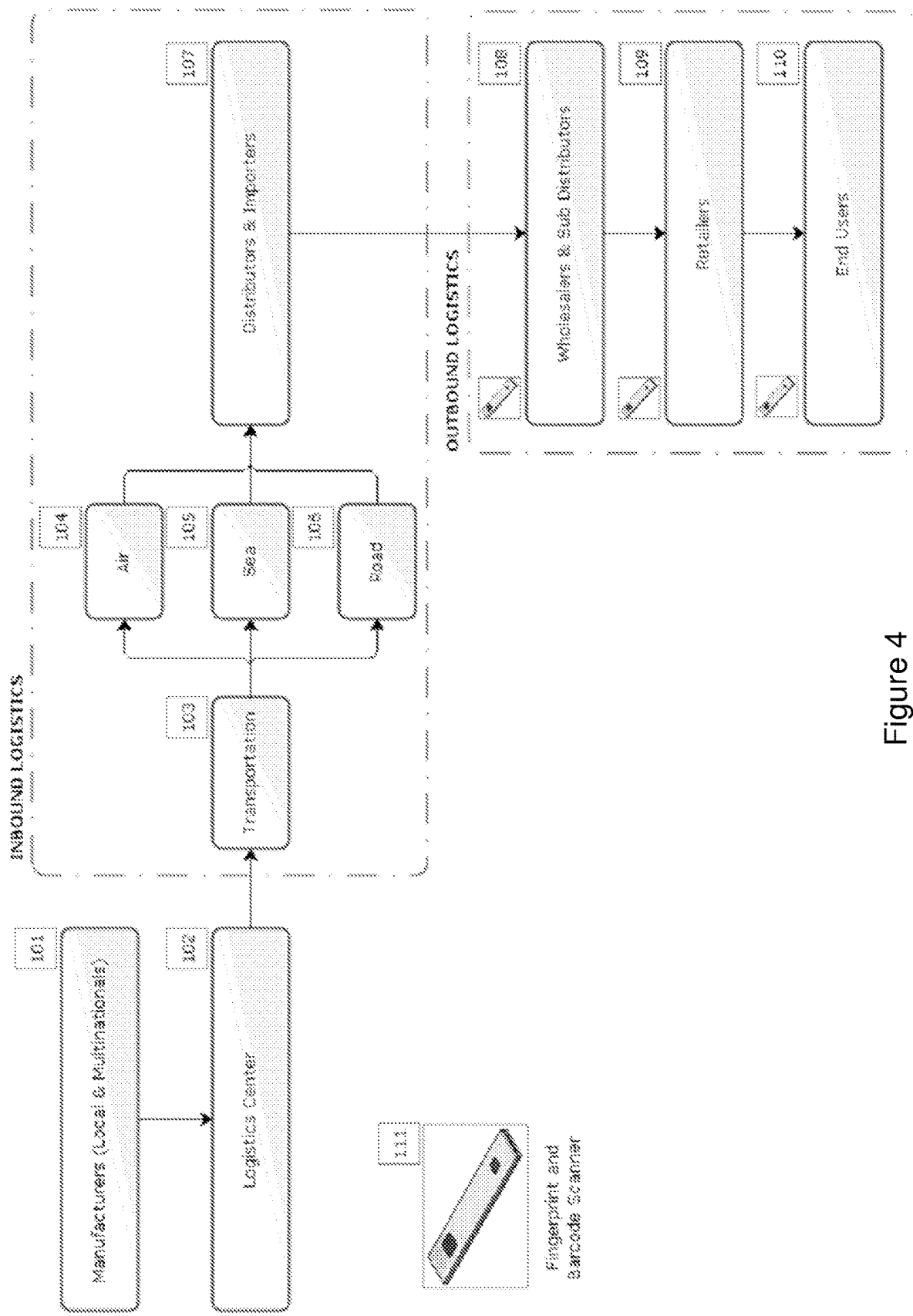
FIG. 4 is a flow chart showing an example of a supply chain at macro level.

FIG. 4 is a flow chart showing an exemplary supply chain at macro level. The supply chain includes manufactures (101), which may be local or international, and a logistics centre (102) which manages products manufactured by the manufacturer. Various transportation (103) methods may be used by the logistics centre (102) in transporting the products to distributors and importers (107). Exemplary transportation (103) methods include, air (104), sea (105) or road (106). Transporting products to distributors and importers (107) may be referred to as inbound logistics. Wholesalers and sub-distributors (108) supply retailers (109) who in turn supply end operators (110), a processes which is referred to as outbound logistics. A supply chain management device (111) may be used at each stage within the outbound logistics and provides statistics and end-to-end detail of the product that is made available to any of the supply chain operators.

Figure 5:
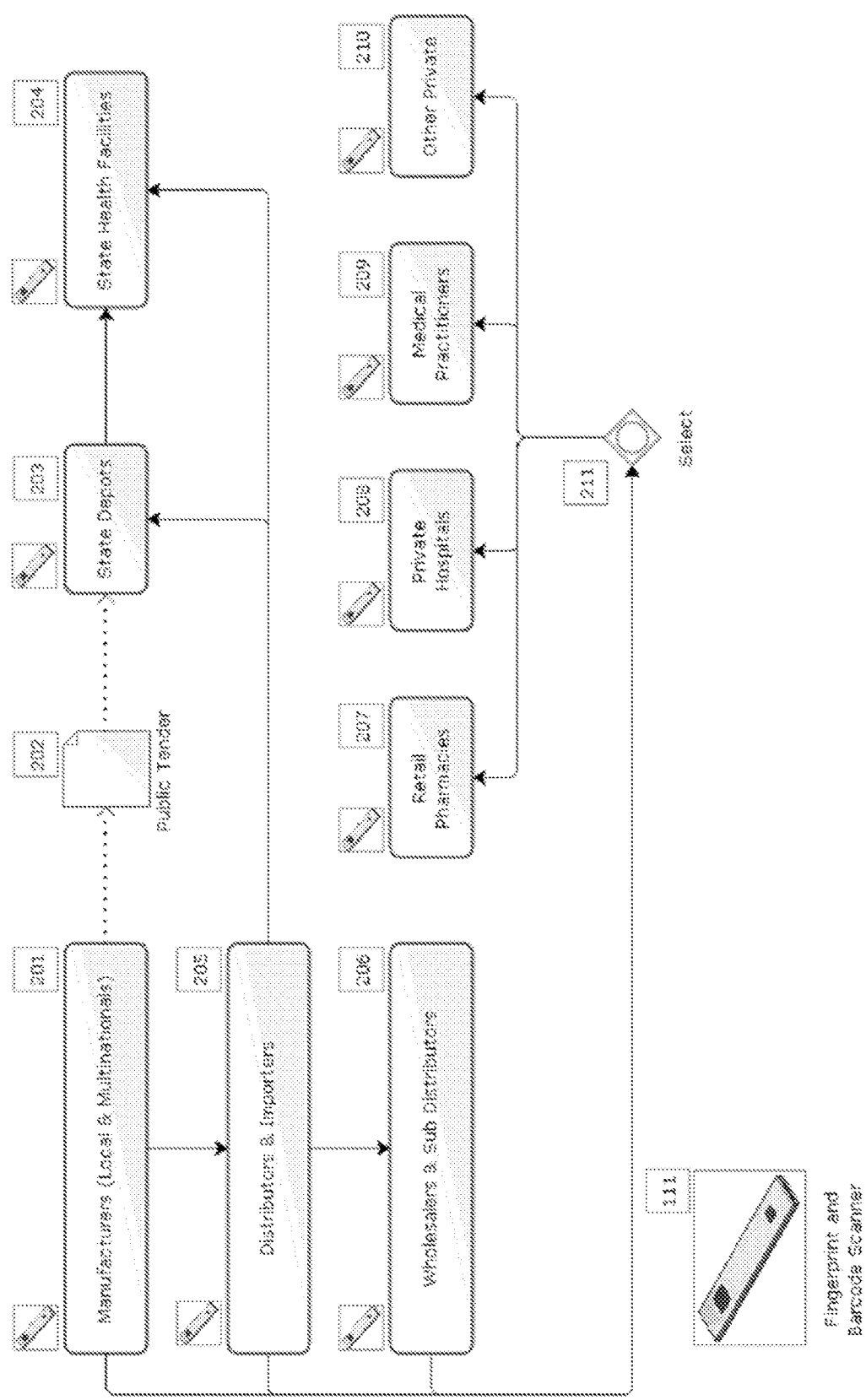
FIG. 5 is a flow chart showing an example of a supply chain of pharmaceuticals at macro level.

FIG. 5 is a flow chart showing an exemplary supply chain of pharmaceuticals at macro level. The local and international manufacturers (201) perform a dual function; firstly, to supply government directly via awarded tenders (202), where the pharmaceuticals are distributed directly to state depots (203) who then supply state health facilities (204); secondly, the pharmaceuticals are distributed to distributors and importers (205) or to wholesalers and sub distributors (206) or even directly to the private health sector (211). Typically the private health sector is split between retail pharmacies (207), private hospitals (208), medical practitioners (209) and other private business (210).

On a micro level the process can be used within a specific segment of a corporation's supply chain to capture and manage data that provides key interest i.e. biometrics only as part of outbound logistics.

Figure 6:
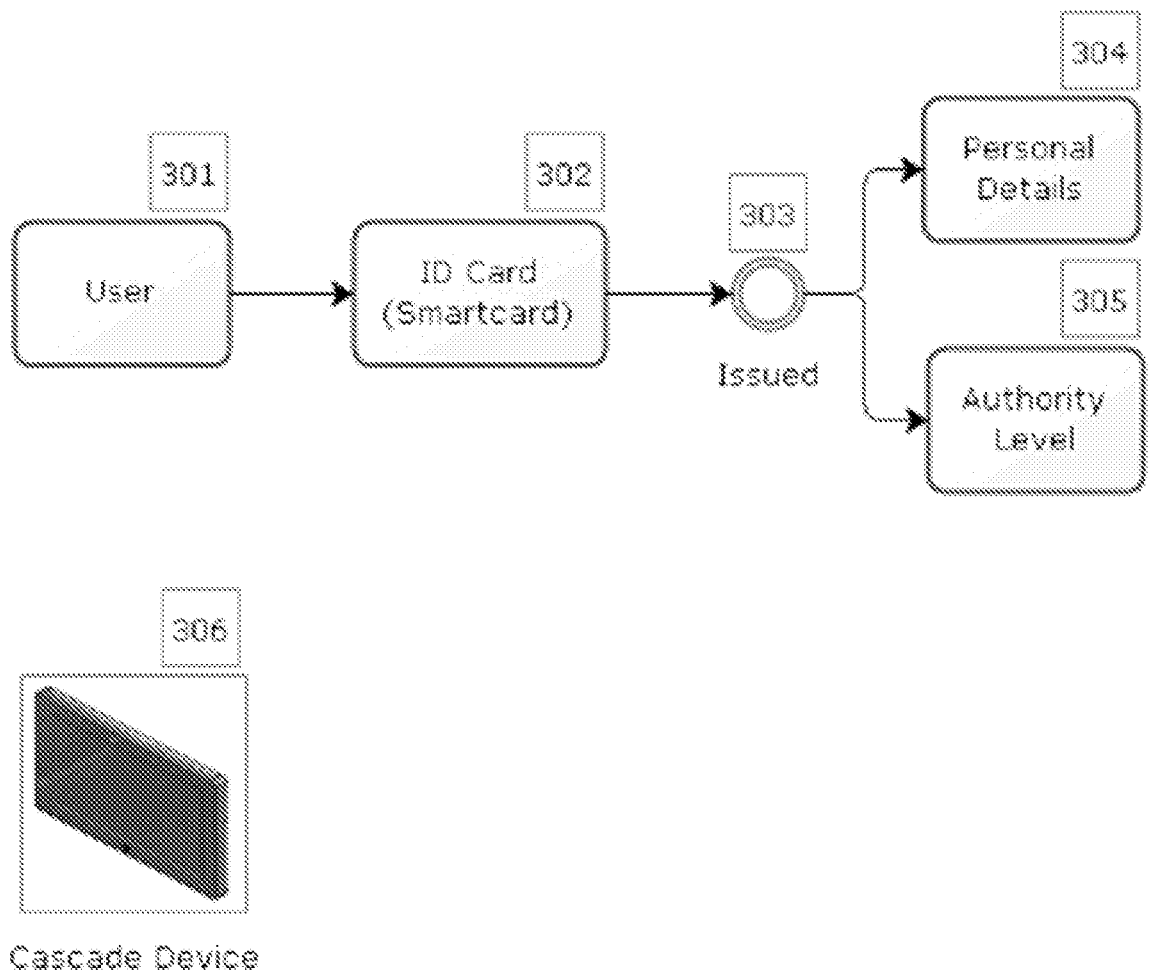
FIG. 6 is a flow chart showing a process for capturing operator information on credential storage device.

FIG. 6 is a flow chart showing an exemplary process of capturing operator information on a credential storage device. The supply chain management device (306) may be a specifically designed tablet computer. The operator (301) is the person designated to use the supply chain management device (306). The operator may be anyone in the outbound logistics referred to in FIG. 4 (e.g. a distributor, wholesaler and retailer). A credential storage device (302) is issued (303) to the designated operator (301) where all relevant personal details (304) are captured. Authority levels (305) are allocated to the operator (301) according to the function to be fulfilled.

Figure 7:
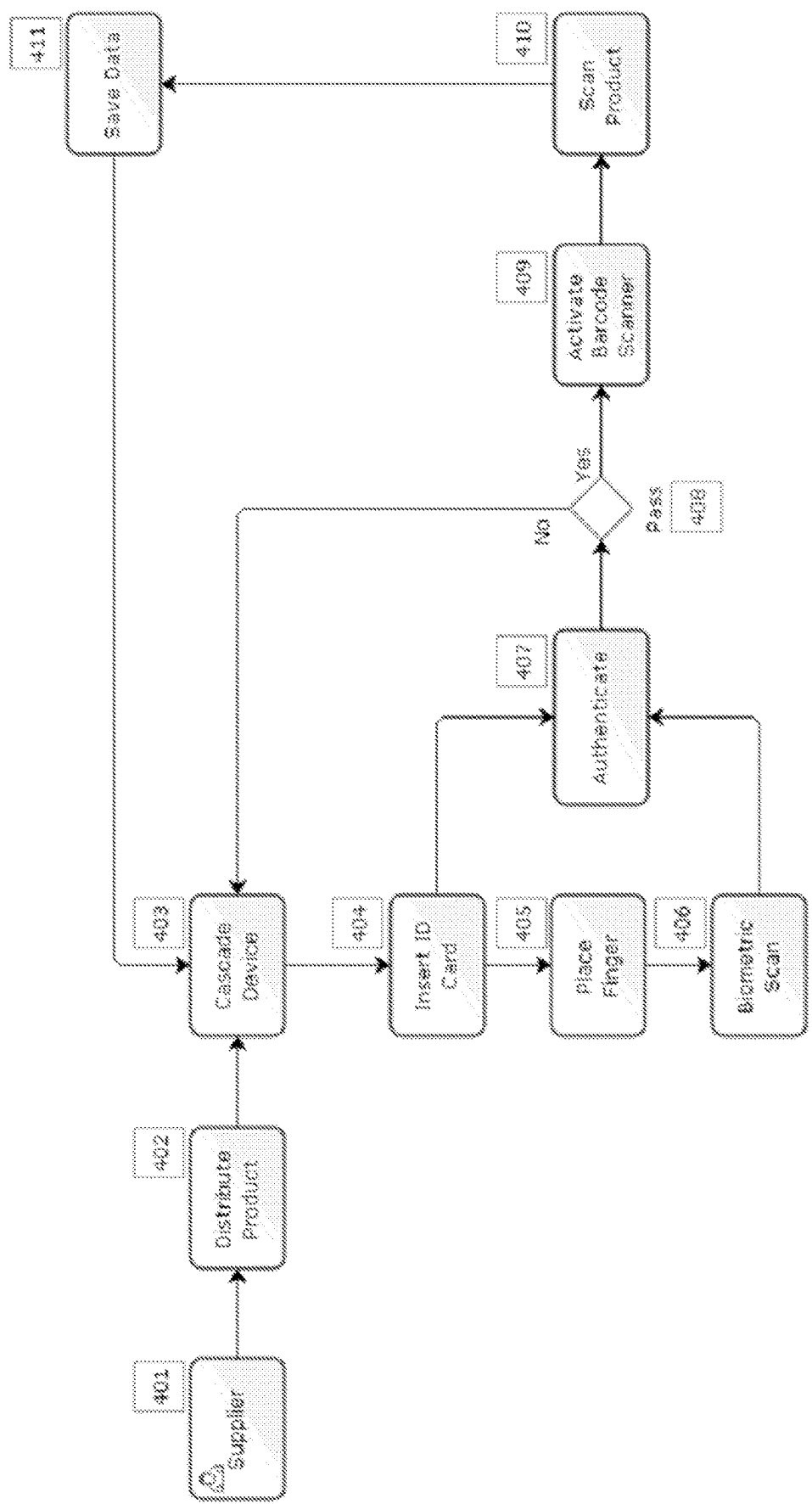
FIG. 7 is a flow chart illustrating a method for managing a supply chain.

FIG. 7 is a flow chart of the scan process using the credential storage device and biometric capturing device. The supplier (401) represents anyone in the outbound logistics role except for the end operator that distributes products (402) using the supply chain management device (403). The supplier (401) places his credential storage device (404) into a credential storage device receiving module the supply chain management device (403) to unlock the device for use. The supplier (401) provides his or her biometric (e.g. a finger (405)) to the biometric capturing device which captures biometric information (406). The supply chain management device (403) authenticates (407) the captured biometric information (406) against the credential storage device (404). If successful (408), the barcode scanning process (409) is activated. The barcode of the product is scanned (410) and all the information (e.g. supplier (operator) name, biometric information and product details/identifier) is saved (411) to the supply chain management device (403).

Figure 8:
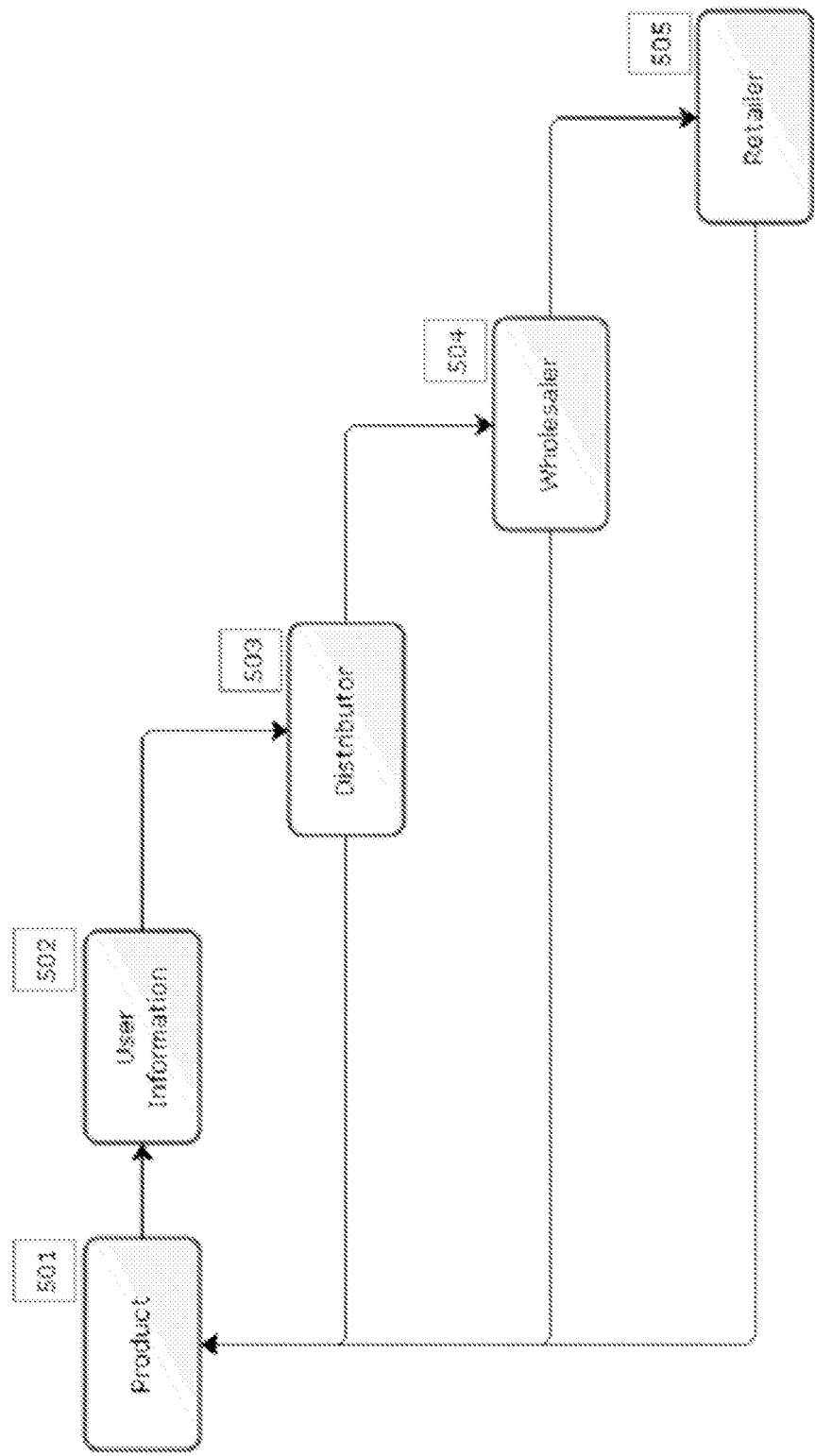
FIG. 8 is a flow chart showing information feedback of a product to a manufacturer.

FIG. 8 is a flow chart showing information feedback of a product to a manufacturer. The product (501) when distributed in outbound logistics has all the relevant operator information linked to it when the distributor, the wholesaler, retailer and end-user use the barcode scan functions (502) of the supply chain management device. It will be appreciated that the process preferably includes an authentication (503) of the product (501) through its identifier. In the event of the identifier of the product failing authentication, the transaction is operably cancelled with the product being flagged or removed (504).

Figure 9:
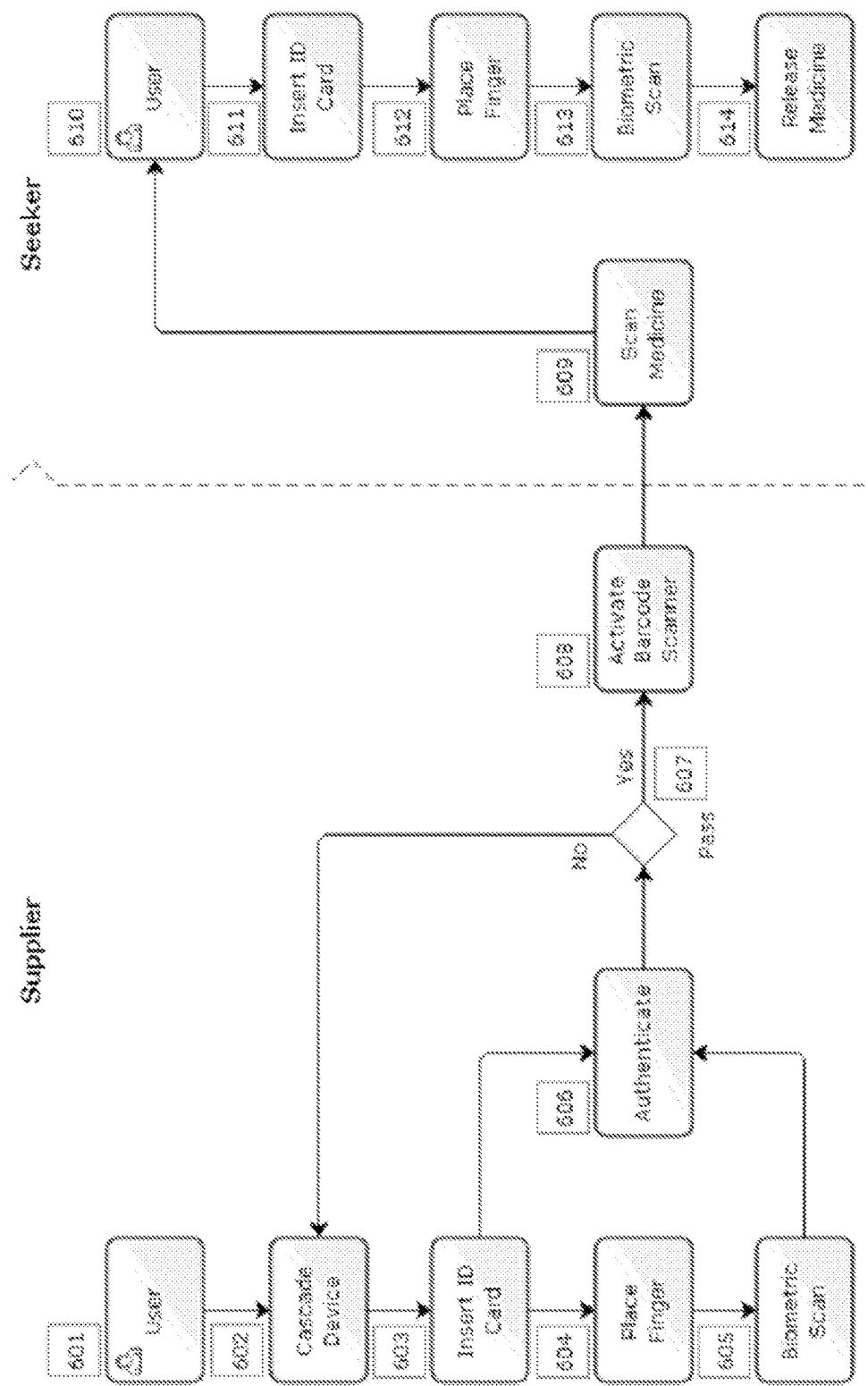
FIG. 9 is a flow chart illustrating a method for managing a supply chain.

FIG. 9 is a flow chart which illustrates an exemplary process using the credential storage device, biometric capturing device and product identifying device in the context of a supplier and a recipient capture. The supplier (601) places his credential storage device (603) into the available the credential storage device receiving module the supply chain management device (602) to unlock for the supply chain management device for use. The supplier (601) places provides his or her biometric information (e.g. a finger (604)) to the biometric capturing device which captures the biometric information (e.g. a fingerprint (605)). The supply chain management device (602) authenticates (606) the biometric information (605) against the credential storage device (603). If successful (607) the product identification process (608) is activated. The supplier (601) identifies the product (e.g. by scanning the barcode of the medicine (609)) to be issued to the recipient (610). The recipient (610) places his credential storage device into the credential storage device receiving module the supply chain management device (602) to unlock for use. The recipient (610) provides his biometric (e.g. a finger (612)) to the biometric capturing device which captures the biometric information (e.g. a fingerprint (613)). Once the biometric information is authenticated, the medicine (614) is released. Though the supply chain focus is on outbound logistics, the following processes can be implemented at inbound logistics as well. Where there is a supplier there is a recipient, from manufacturer through the supply chain down to the retailer this system can capture specific events and interactions.

Figure 10:
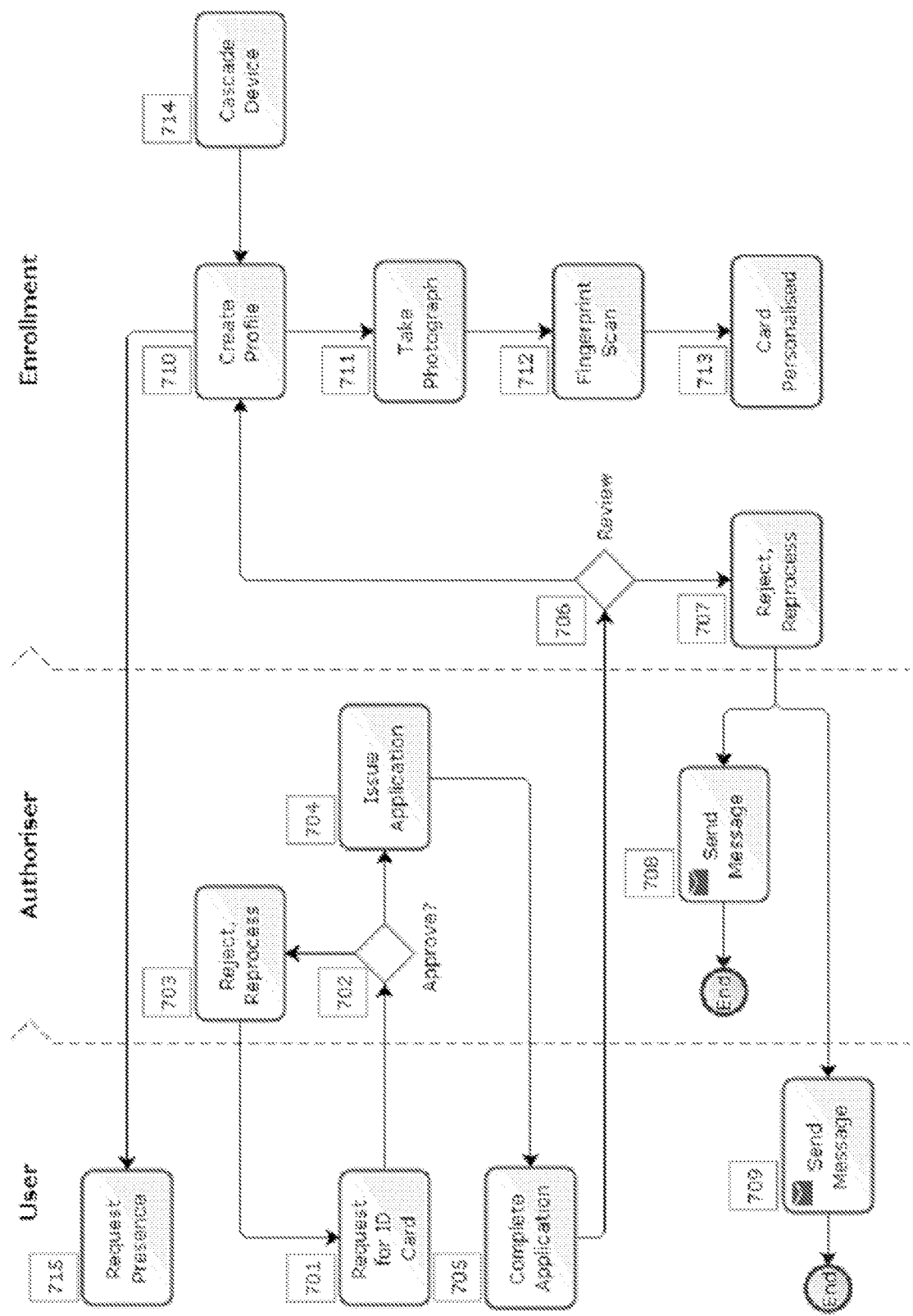
FIG. 10 is a flow chart which illustrates an exemplary enrollment process.

FIG. 10 is a flow chart which illustrates an exemplary credential storage device enrollment process. The operator requests a credential storage device (701) form the authoriser who then approves (702) the application and issues the relevant application form (704) to the operator to complete (705). The request may also be declined (702) and sent back (703) for possible reprocessing. When the operator completes the application form (705) the document is sent to the enrollment department for processing. The application is reviewed (706). The application may be rejected or sent back for reprocessing (707) to the authoriser (708) and operator (709). The application can be resubmitted when the highlighted problems are resolved. When the application meets the criteria, an operator profile is created (710) using the credential storage device reader software installed on the supply chain management device (714). When the enrollment department is ready the operator's presence is requested (715). A photograph is taken (711) with the supply chain management device (714); a fingerprint (biometric) scan is taken (712) with the supply chain management device (714); and the credential storage device is personalised including the operator password. All the recorded data is stored on the supply chain management device (714).

Figure 11:
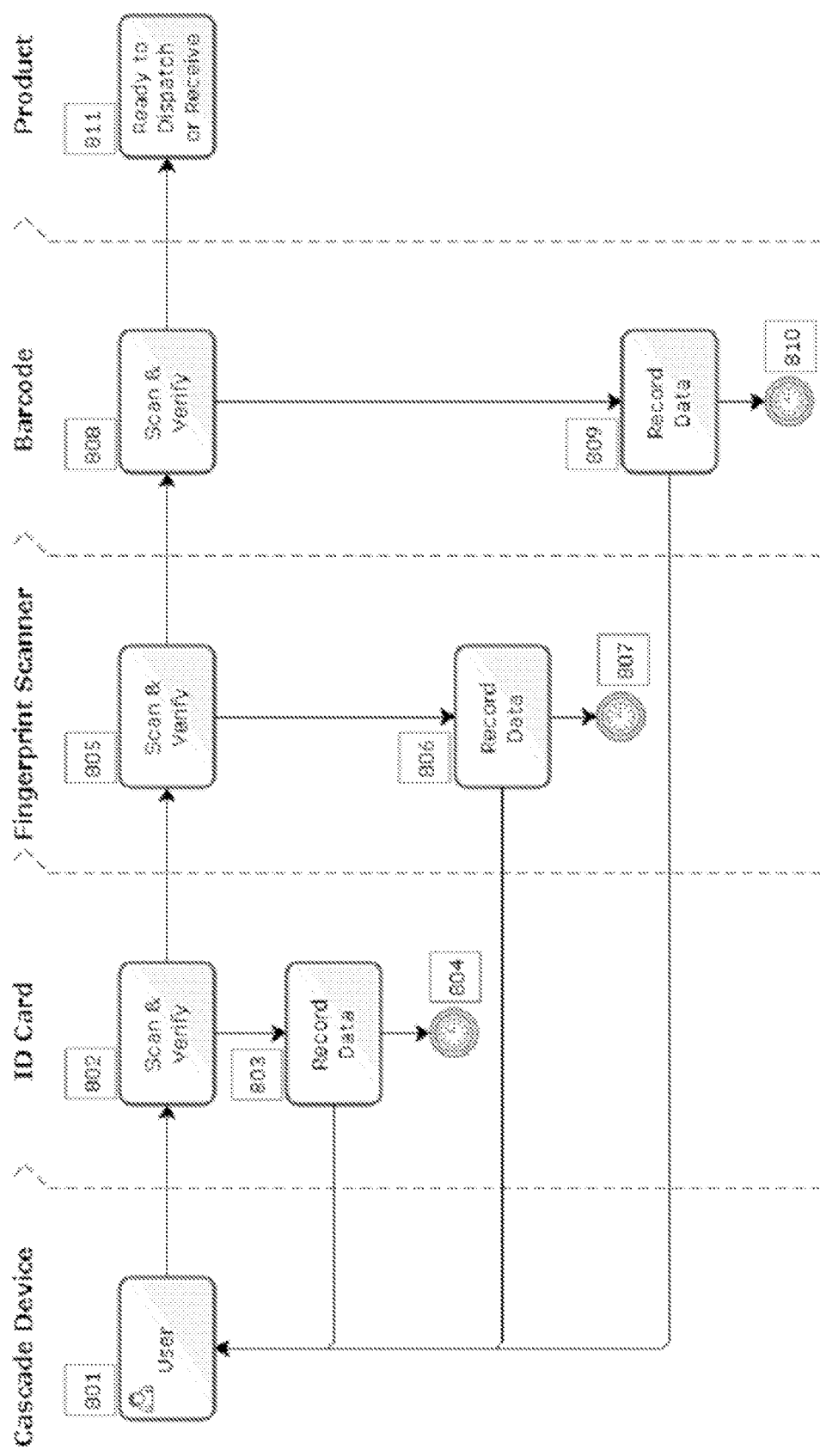
FIG. 11 is a flow chart illustrating a method for managing a supply chain.

FIG. 11 is a flow chart of an exemplary supply chain management process using the supply chain management system through the supply chain. The operator (801) takes the supply chain management device, places his credential storage device into the credential storage device receiving module, scans, verifies and authenticates (802) his credentials. The data is recorded (803) including a date and time stamp (804) onto the supply chain management device. The biometric capturing device is activated and the operator (801) places e.g. his finger on the biometric capturing device, captures a biometric and verifies (805) the captured biometric. The data is recorded (806) including a date and time stamp (807) onto the supply chain management device. The product identifying device is activated and the operator (801) identifies the product (e.g. by scanning, verifying and authenticating (808) a barcode). Once the product has been authenticated as genuine (809), the data is recorded (812) including a date and time stamp (813) onto the supply chain management device. The product is ready to be shipped or received (814). In the event of the product failing authentication it is not dispense but flagged (810), allowing for the product removal from the supply chain (811).

FIG. 11A is a table of exemplary traceable data as may be recorded through various supply chain stages described in FIG. 11. FIG. 11B is a table of exemplary traceable data for pharmaceuticals as may be recorded through the various stages described in FIG. 11.

Figure 12:
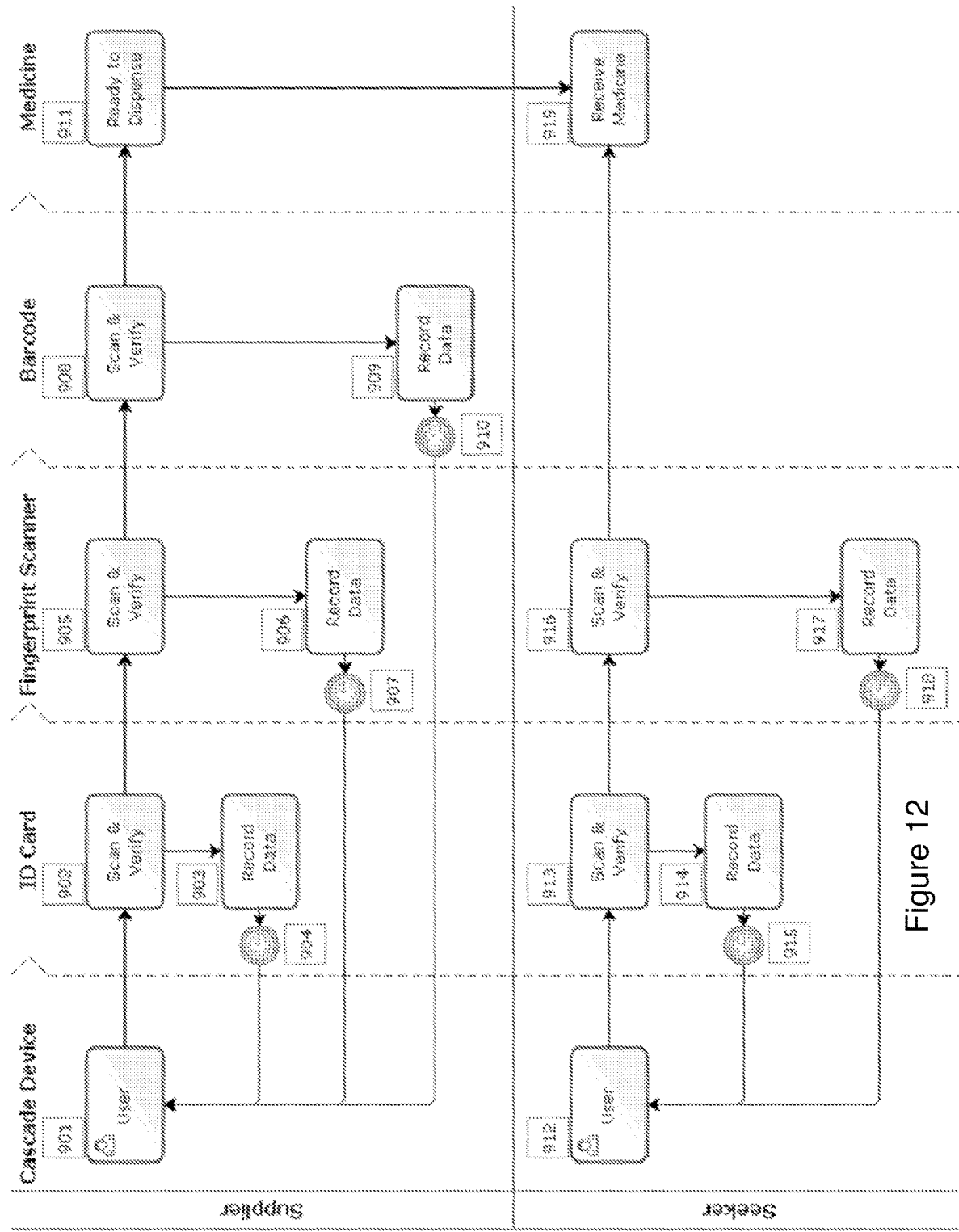
FIG. 12 is a flow chart which illustrates a method for managing a supply chain in which a supplier and recipient participate.

FIG. 12 is a flow chart of an exemplary supply chain management process which uses a supply chain management system between a supplier and a recipient (seeker). The supplier (901) places his credential storage device into the credential storage device receiving module of his supply chain management device which scans and verifies (902) his credentials. The data is recorded (903) including a date and time stamp (904) onto the supply chain management device. The biometric capturing device is activated and the operator (901) provides biometric information to the biometric capturing device which obtains and verifies (905) biometric information of the operator. The data is recorded (906) including a date and time stamp (907) onto the supply chain management device. A product identifying device of the supply chain management device is activated to enable the supplier (901) to identify the product (e.g. by scanning and verifying (908) a barcode thereof). The data is recorded (909) including a date and time stamp (910) onto the supply chain management device. Thereafter, the medicine is ready to dispense (911). In order to take delivery of the medicine, the recipient (912) places his credential storage device into the credential storage device receiving module. Information stored on the credential storage device is obtained and verified (913) by the supplier (901). The data is recorded (914) and date and time stamped (915) in the supply chain management device. The biometric capturing device is activated and the recipient (912) provides his biometric to the biometric capturing device which obtains and verifies (916) biometric information of the recipient. The data is recorded (917) and date and time stamped (918) in the supply chain management device. Thereafter, the supplier (901) may dispense (919) the medicine to the recipient (912).

Figure 13:
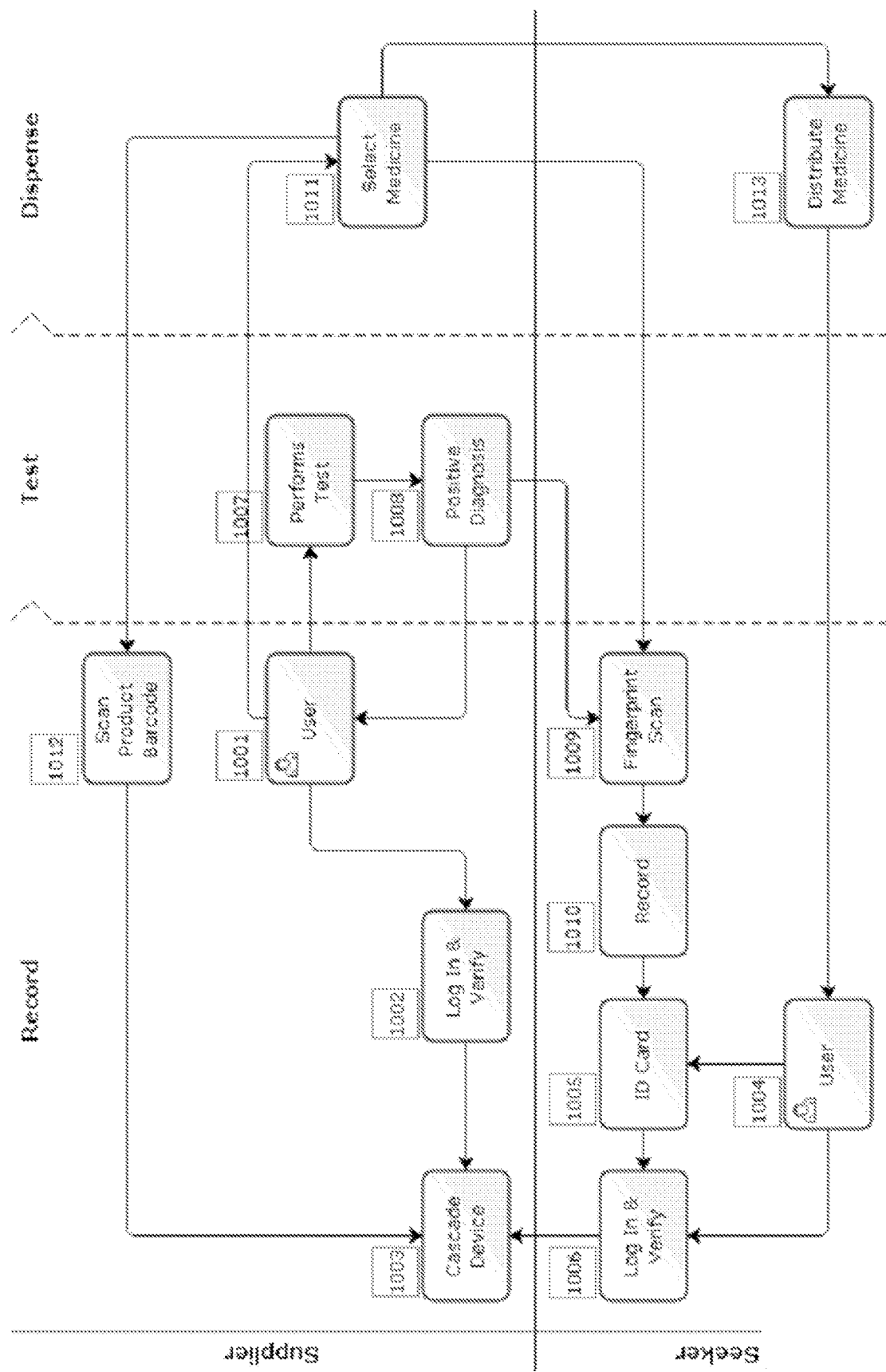
FIG. 13 is a flow chart which illustrates a method in which diagnostic information is obtained and medicine dispensed.

FIG. 13 is a flow chart which illustrates an exemplary supply chain management process which utilises a supply chain management system to diagnosis and dispense medicine. The recipient (1004) arrives at a health facility and presents his credential storage device (1005) to the supplier (1001). Initially, the supplier (1001) logs in (this includes inserting his credential storage device into the credential storage device receiving module and providing a biometric from which biometric information can be obtained) (1002) into the supply chain management device (1003). The supplier (1001) inserts the recipient's (1004) credential storage device (1005), logs in and verifies (1006) (this includes fingerprint (biometric) scan) into the supply chain management device (1003). The supplier (1001) performs the required test (1007) (e.g. a medical test) on the recipient (1004). When a positive diagnosis (1006) has been established, the supplier (1001) obtains biometric information (1009) of the recipient (1004) and records (1010) the results on the credential storage device (1005) and the supply chain management device (1003). The supplier (1001) selects the appropriate medicine (1011) and scans the product barcode (1012) and records the information to the supply chain management device (1003). The supplier (1001) obtains biometric information (1009) of the recipient (1004) and records (1010) the medicine information on the credential storage device (1005) and the supply chain management device (1003). The medicine is distributed (1013) to the recipient (1004) by the supplier (1001).

Figure 14:
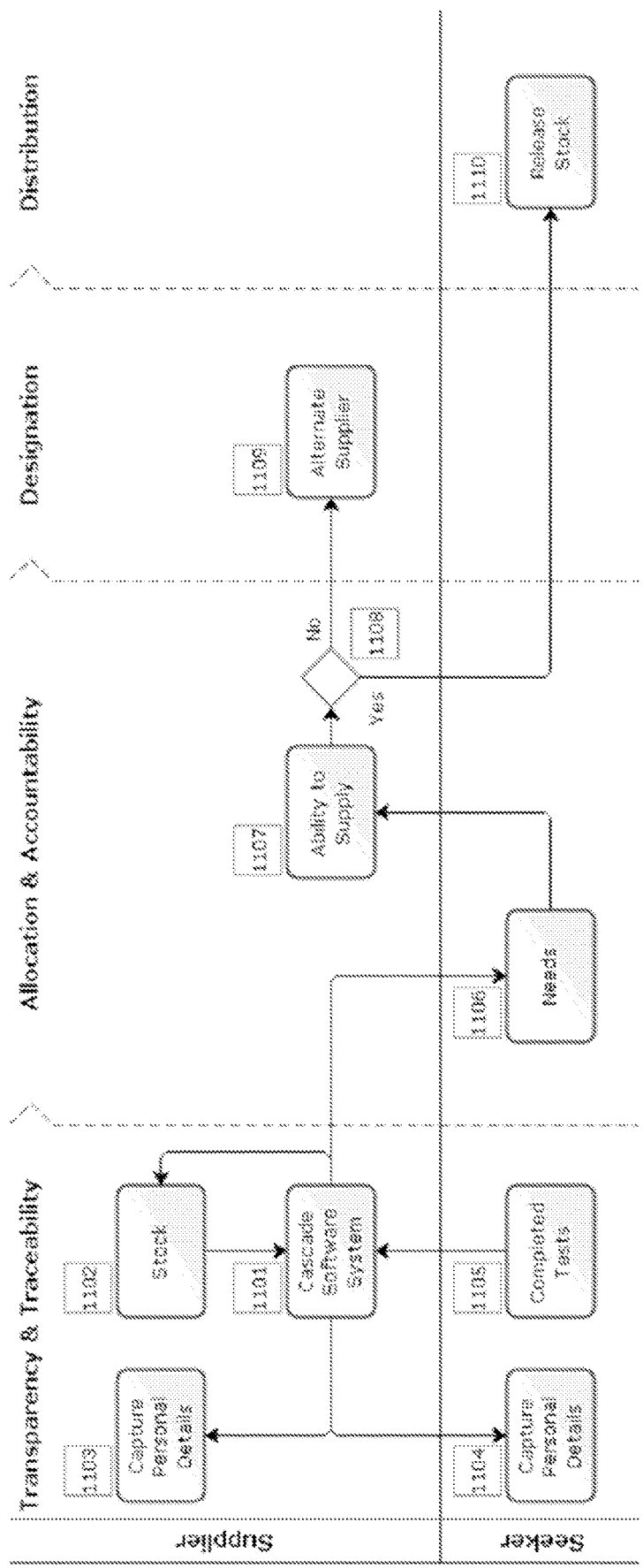
FIG. 14 is a flow chart illustrating a method for managing a supply chain in which product availability is determined and an alternative supplier is identified.

FIG. 14 is a flow chart which illustrates interactions between a supply chain management system and a pharmaceutical supply chain at recipient level. The supply chain management system (1101) has a database to add, retrieve or update stored information to manage stock (1102), to capture personal details of the supplier (1103), to capture personal details of the recipient (1104) and to capture the tests results (1105) of the recipient (1104). Furthermore, the supply chain management system (1101) captures the data input by the supplier to determine the needs (1106) required by the recipient (1104). For example, a positive test result for malaria allows for the release of the appropriate medicines. The stock (1102) availability is checked to ascertain whether the supplier has the ability to supply (1107) the appropriate stock. A decision (1108) is made to either find an alternate supplier (1109) that has the legitimate stock if the stock is not available, if available then release (1110) the legitimate stock to the recipient (1104).

Figure 14A:
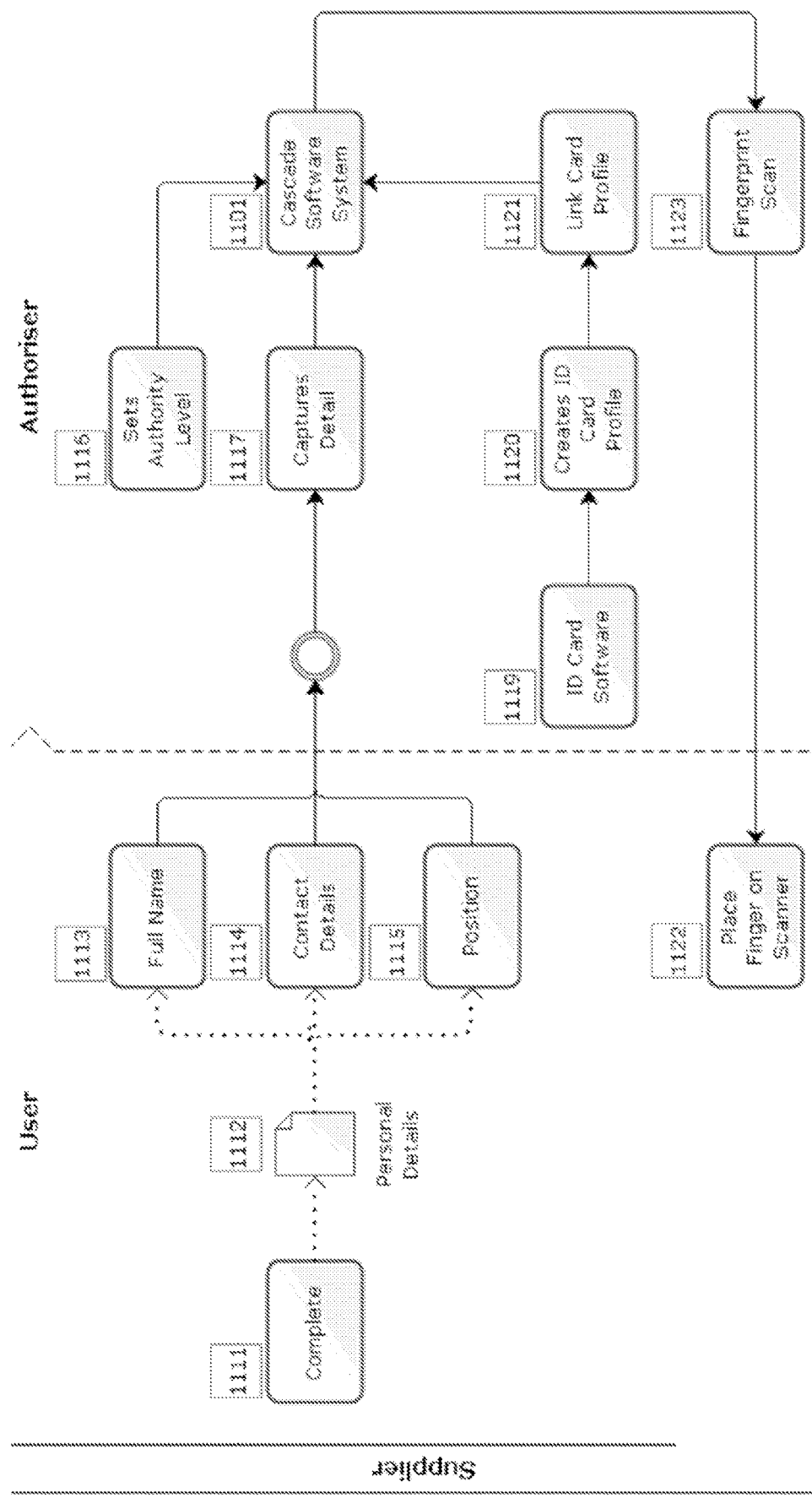
FIG. 14A is a flow chart which illustrates a stage of the method illustrated in FIG. 14 in greater detail.

FIG. 14A is a flow chart showing a detailed sub process associated with capturing personal details of the supplier (1103) illustrated in FIG. 14. The supplier allocated to use the supply chain management system (1101) completes (1111) an application form (1112) and fills in his personal details, namely, full name with identification number (1113), contact details (1114) e.g. address, telephone number, email etc. and the position or title (1115) he holds within the organization. The completed form is handed to the authoriser who captures (1117) the detail onto the supply chain management system (1101). The authoriser sets (1116) the authority level of the operator. The authoriser creates a credential storage device profile (1120) using credential storage device software (1119) (as illustrated in FIG. 10). Once the credential storage device issue process is complete, the credential storage device is inserted into the credential storage device receiving module of the supply chain management device and links the credential storage device profile (1121) to the supply chain management system (1101). The operator provides biometric information which is captured by a biometric capturing device (1122) and the authoriser records the biometric information (1123) and records the data to the supply chain management system (1101).

Figure 14B:
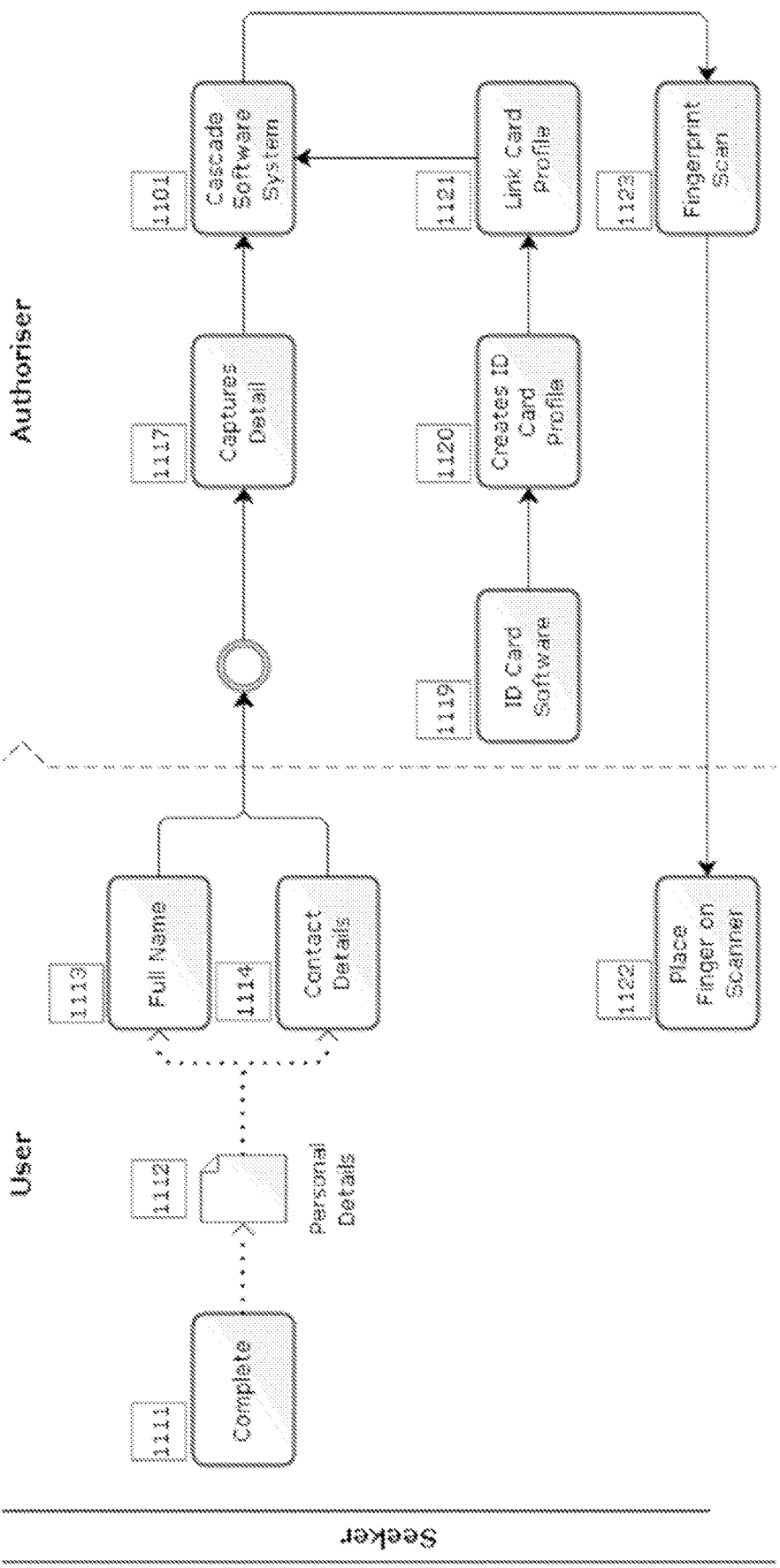
FIG. 14B is a flow chart which illustrates another stage of the method illustrated in FIG. 14 in greater detail.

FIG. 14B is a flow chart illustrating a detailed sub-process of capturing personal details of the recipient (1104) as illustrated in FIG. 14. The supplier allocated to use the supply chain management system (1101) completes (1111) an application form (1112) in fills in his personal details, namely, full name with identification number (1113) and contact details (1114) e.g. address, telephone number, email, etc. The completed form is handed to the authoriser who captures (1117) the detail onto the supply chain management system (1101). The authoriser creates a credential storage device profile (1120) using the credential storage device software (1119) (as illustrated in FIG. 10). Once the credential storage device issue process is complete, the credential storage device is inserted into the credential storage device receiving module of the supply chain management device which links the credential storage device profile (1121) to the supply chain management system (1101). The operator provides biometric information (e.g. places his finger on a scanner) (1122) and the authoriser records the biometric information (e.g. fingerprint) (1123) and saves the data to the supply chain management system (1101).

Figure 15:
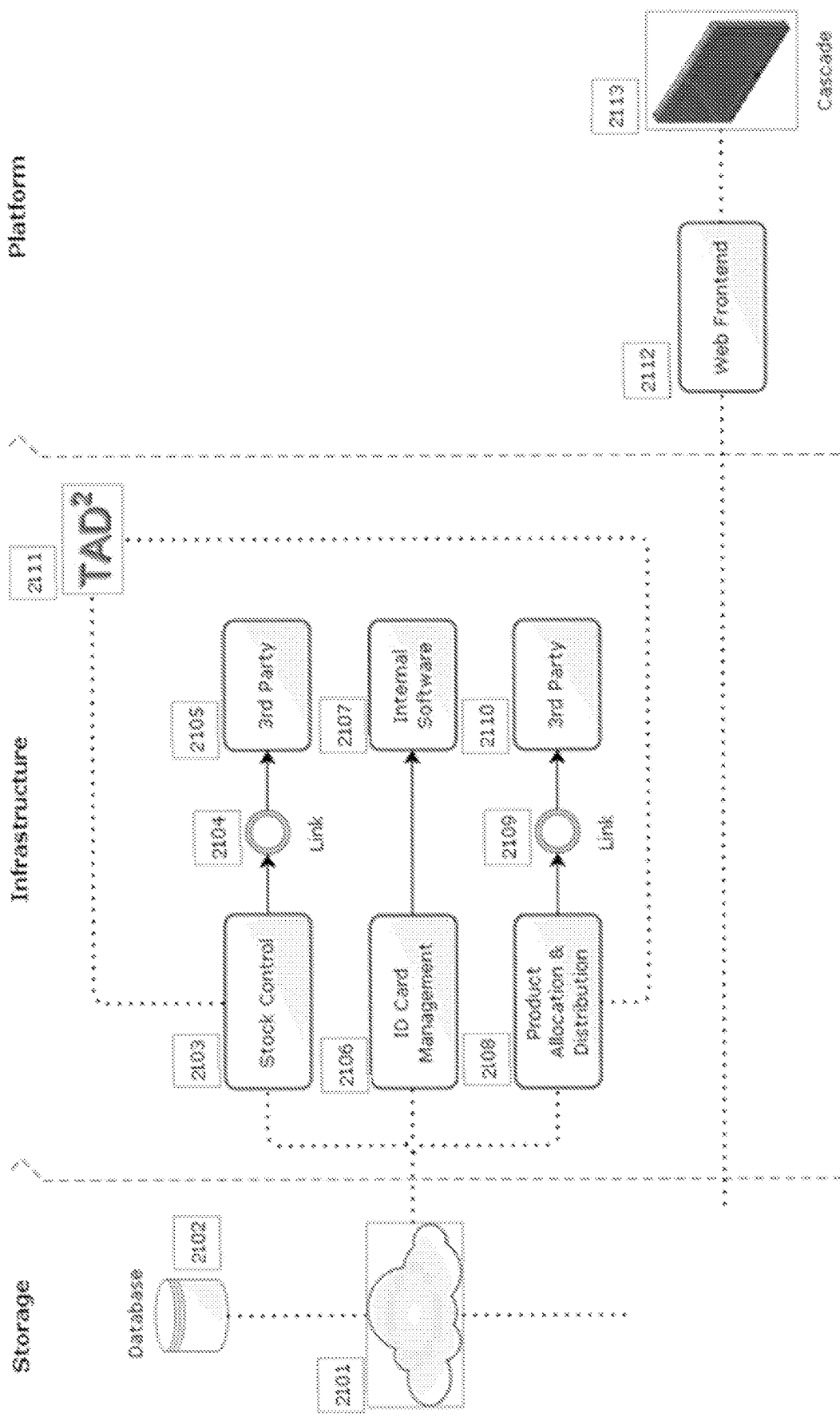
FIG. 15 is a schematic diagram which illustrates aspects of an exemplary supply chain management system.

FIG. 15 is a schematic diagram which illustrates a high level layout of an exemplary supply chain management system. Using a cloud (2101) based server, a central database (2102) stores all information linked to the system. Infrastructure includes various backend systems utilised in the process. The infrastructure includes stock control (2103) processes that are linked (2104) to a third party (2105) software system to extract the relevant information. The infrastructure further includes a credential storage device management (2106) system which uses its own software (2107) to register and manage operators. The product allocation and distribution (2108) system is the process to select and issue product (e.g. medicine) to the recipient (e.g. a patient). The stock control (2103) process and the product allocation and distribution (2108) system are linked to the supply chain management system. A platform includes a web based frontend system (2112) that allows operators to access the cloud via the supply chain management device (2113).

Figure 16:
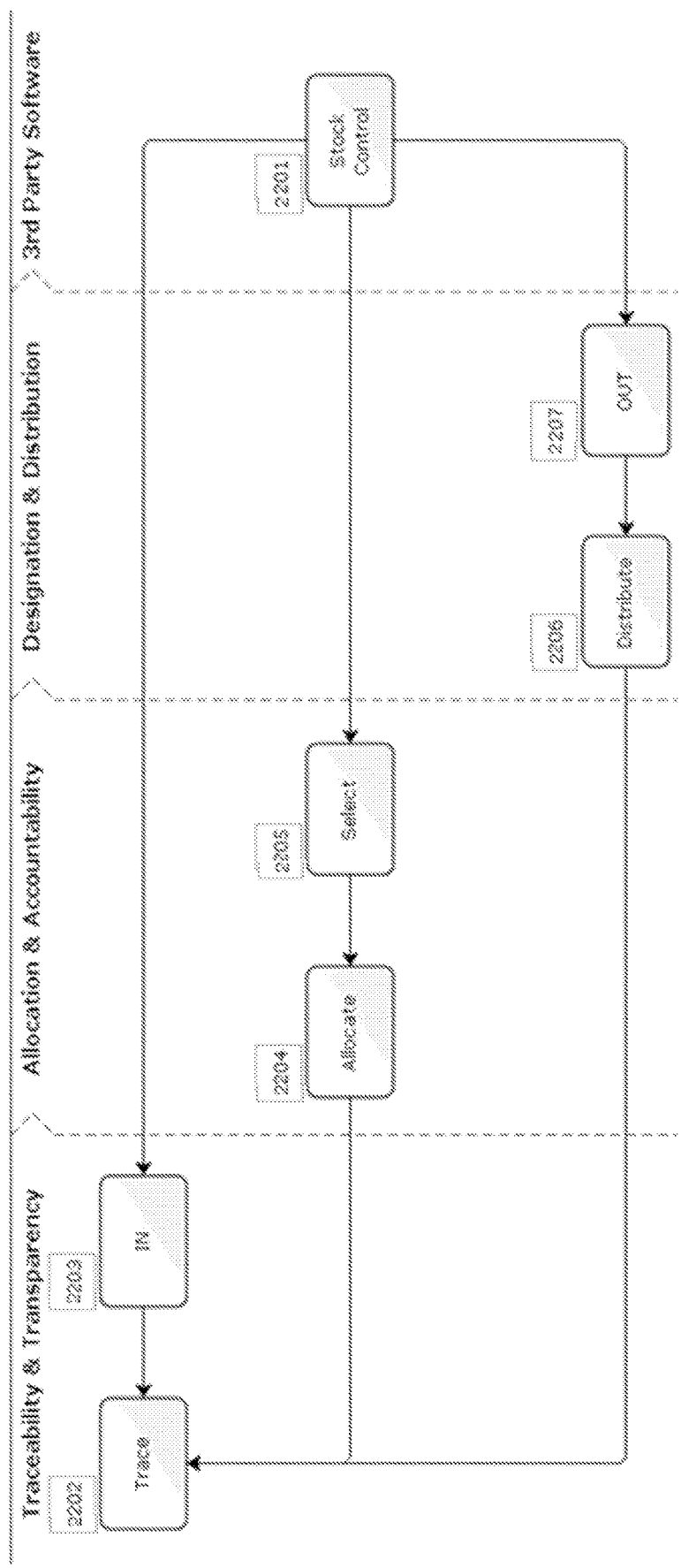
FIG. 16 is a schematic diagram which illustrates third party integration with a supply chain management system.

FIG. 16 is a schematic diagram which illustrates at an intermediate level how third party software may interface with a supply chain management system. Third party software refers to platforms which may be used by third parties along the supply chain to manage their stock in and stock out. The stock control (2201) process includes stock in (2203) which sends selected information to a trace (2202) system. When stock is selected (2205) and allocated (2204) the selected information is sent to the trace (2202) system. Stock out (2207) refers to the distribution (2206) of stock to the recipient and selected information is sent to the trace (2202) system.

Figure 16A:
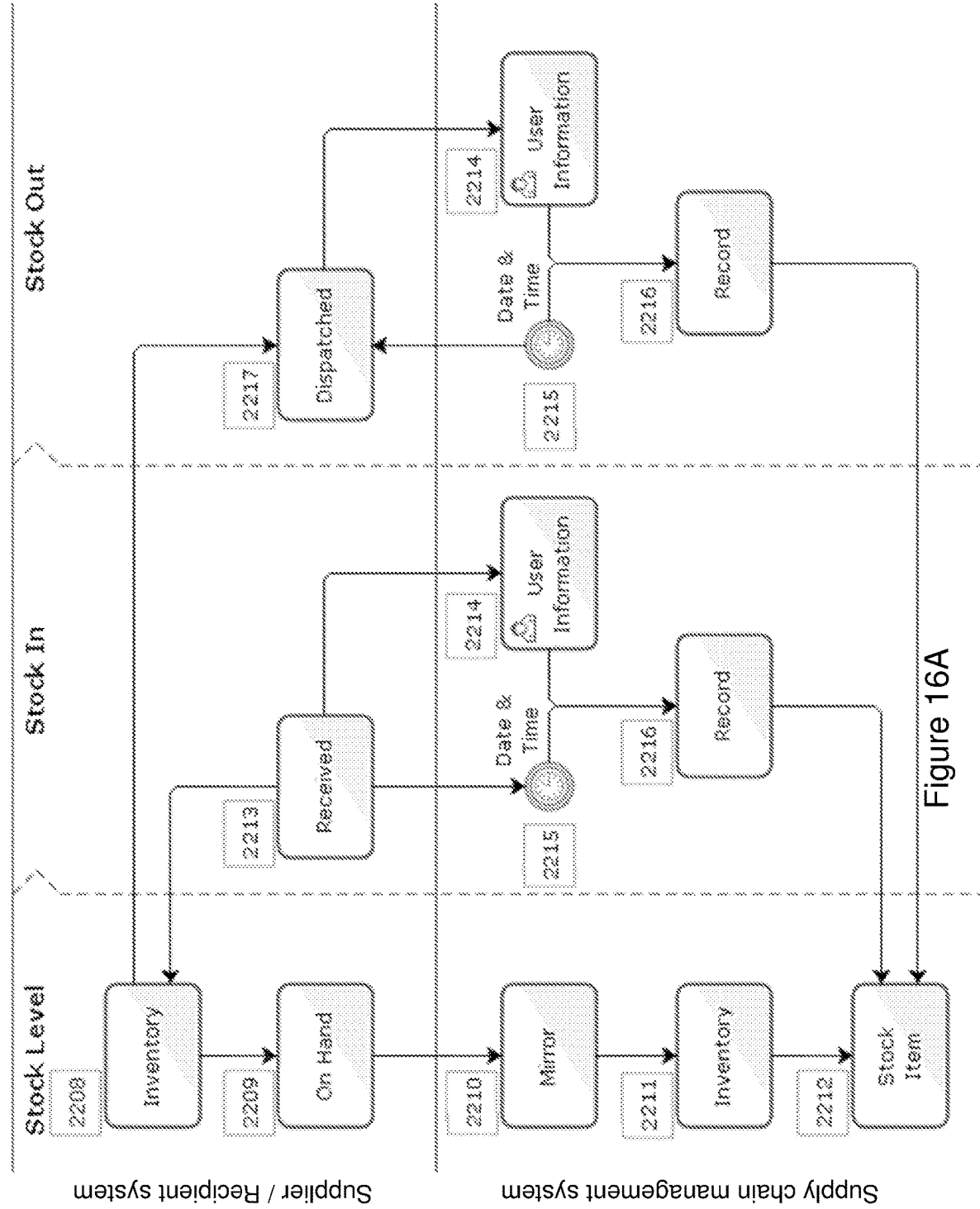
FIG. 16A illustrates an intermediate level of data flow between a supplier and/or a recipient and the supply chain management system.
Figure 16B:
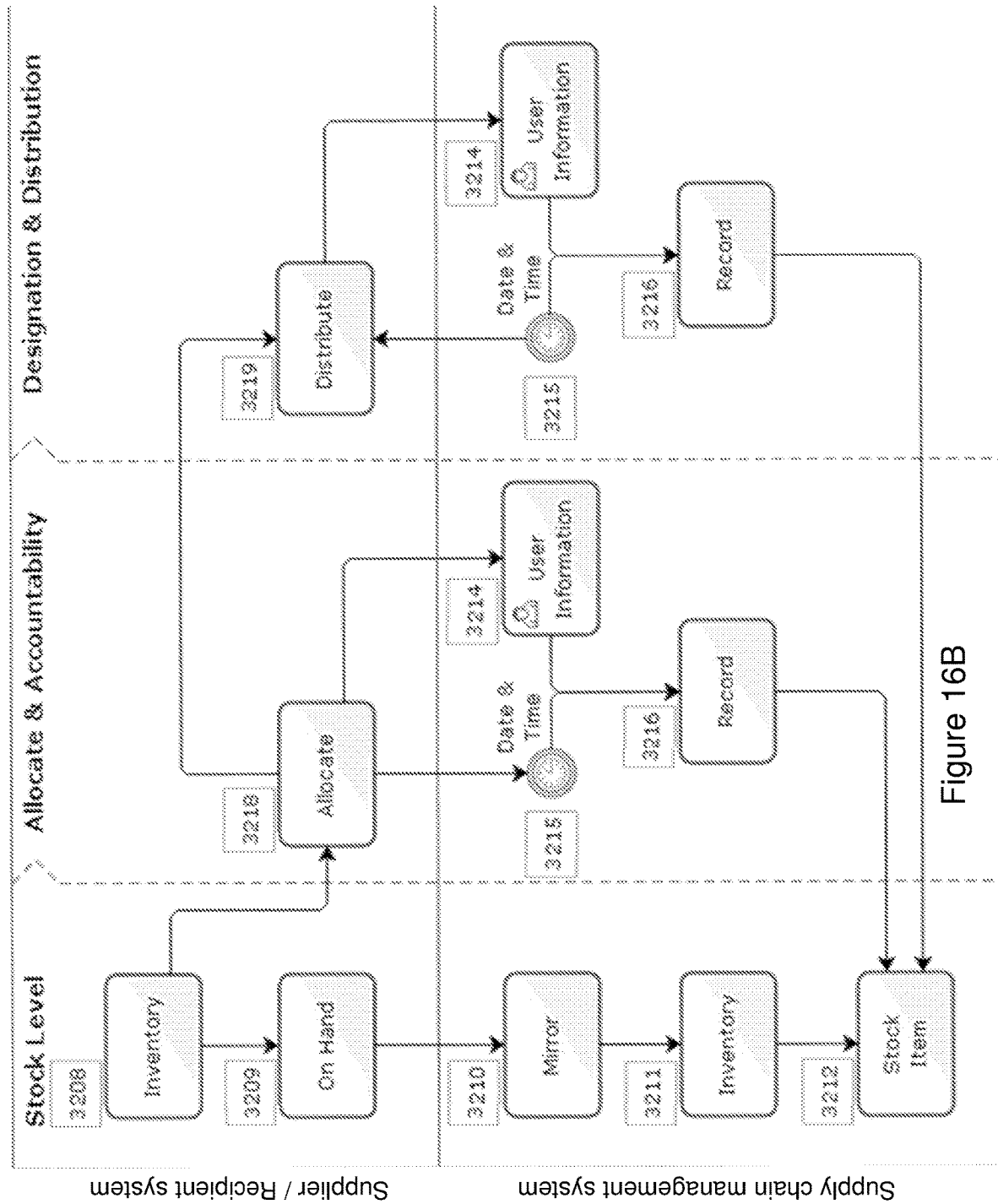
FIG. 16B illustrates an intermediate level of data flow between a supplier and/or a recipient and the supply chain management system.

FIG. 16A is a flow diagram which illustrates an intermediate level of data flow between a supplier and/or a recipient and a supply chain management system. The inventory (2208) on hand (2209) on the recipient supplier platform needs to mirror (2210) to the inventory (2211) database on the supply chain management system. Each stock item (2212) will track data received, as will be explained further below.

For stock in, recipient/supplier platform processes inventory received (2213) and updates the inventory (2208) on hand (2209). The supply chain management system records the operator information (2214) (including information obtained from a credential storage device and biometric capturing device) with a date and time (2215) of transaction. The captured information is recorded (2216) against the individual stock item (2212) (e.g. against a product identifier).

For stock out, the recipient and/or supplier platform processes inventory dispatched (2217) and updates the inventory (2208) on hand (2209). The supply chain management system records the operator information (2214) (including information obtained from a credential storage device and biometric capturing device) with a date and time (2215) of transaction. The captured information is recorded (2216) against the individual stock item (2212) (e.g. against a product identifier).

FIG. 16 is a flow diagram which illustrates an intermediate level of data flow between a supplier and/or a recipient and the supply chain management system. Inventory (3208) on hand (3209) on the recipient/supplier platform needs to mirror (3210) to the inventory (3211) database on the supply chain management system. Each stock item (3212) will track data received. The recipient/supplier platform allocates (3218) available inventories (3208) to be distributed (3219). The supply chain management system records the operator information (3214) (including information obtained from a credential storage device and biometric capturing device) with a date and time (3215) of transaction. The captured information is recorded (3216) against the individual stock item (3212).

Figure 17:
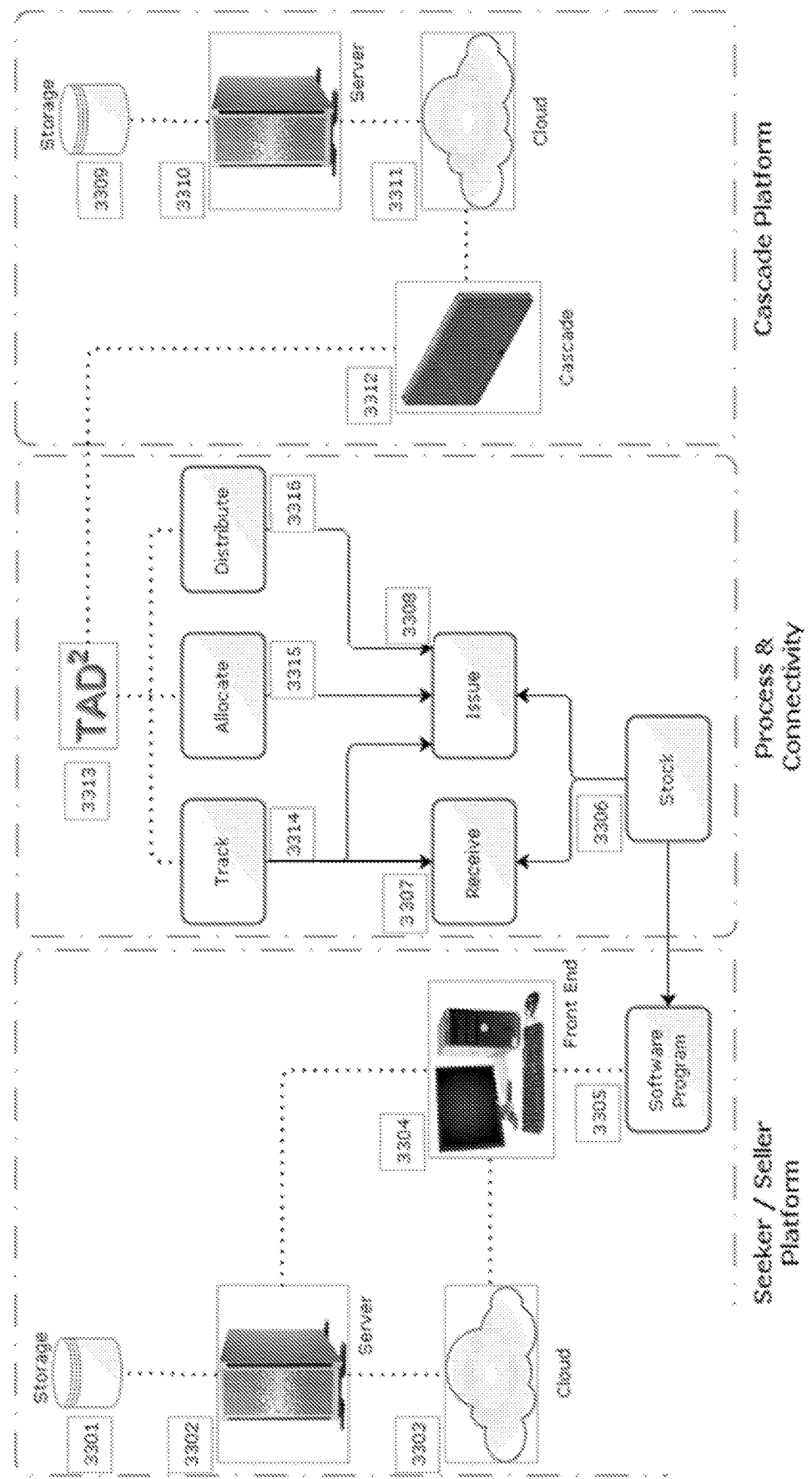
FIG. 17 is a schematic diagram which illustrates aspects of an exemplary supply chain management system.

FIG. 17 is a high level flowchart which illustrates exemplary interfaces between a supply chain management system and a recipient/supplier system. The recipient/supplier system includes a storage database (3301) which may reside on a server (3302). The server (3302) in turn connects to a front end workstation (3304) either directly or through a cloud platform (3303). The recipient/supplier is able to log into the front end workstation (3304) and loads an appropriate software program (3305) which manages stock (3306). Stock is either received (3307) or issued (3308) as may be appropriate. The supply chain management system includes a storage database (3309) which may reside on a server (3310). The server (3310) connects to the supply chain management device (3312) through a cloud (3311) platform. The supply chain management software (3313) is operable to gather information from the recipient/supplier platform as stock is received, sold, dispensed or the like. A process and connectivity module is provided which includes a track module (3314). The track module (3314) enables a traceability and transparency process that follows the journey of the stock (3307) and (3308) from manufacturer to end-operator depending on the supply chain needs. An allocate module (3315) is provided which enables an allocation and accountability process that checks the stock availability (3308) and suggests alternative supply, whether at source or alternative options. A distribute module (3316) is provided which enables a designation and distribution process for selling or dispensing (3308) of stock.

Figure 18A:
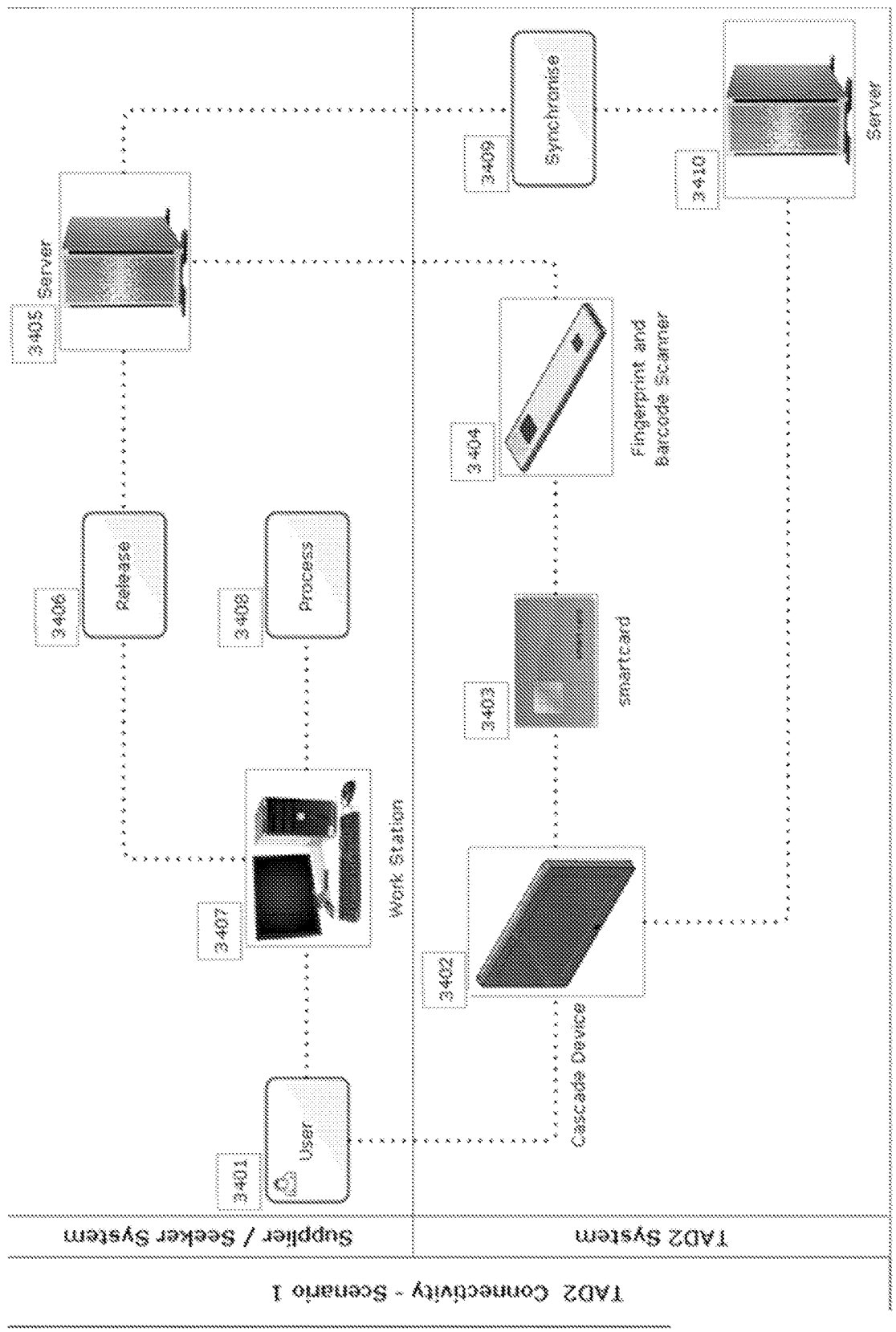
FIG. 18A is a schematic diagram which illustrates a first exemplary in-use scenario.

FIG. 18A is a flowchart which illustrates connectivity which may be implemented between a supplier/recipient system and a supply chain management system according to one embodiment. In this embodiment, a supply chain management device is used alongside a supplier/recipient work station. An operator (3401) logs into the supply chain management device (3402), inserts his credential storage device (3403) and provides biometric information for capture by a biometric capturing device (3404). The information is sent to a third party server computer (3405) which then releases (3406) the work station (3407) to do the required processes (3408). The work station may, for example, identify a product which is to be dispensed or disposed of, or identify a product which is to be received. The data is synchronised (3409) between the third party server computer (3405) and the central server computer (3410).

Figure 18B:
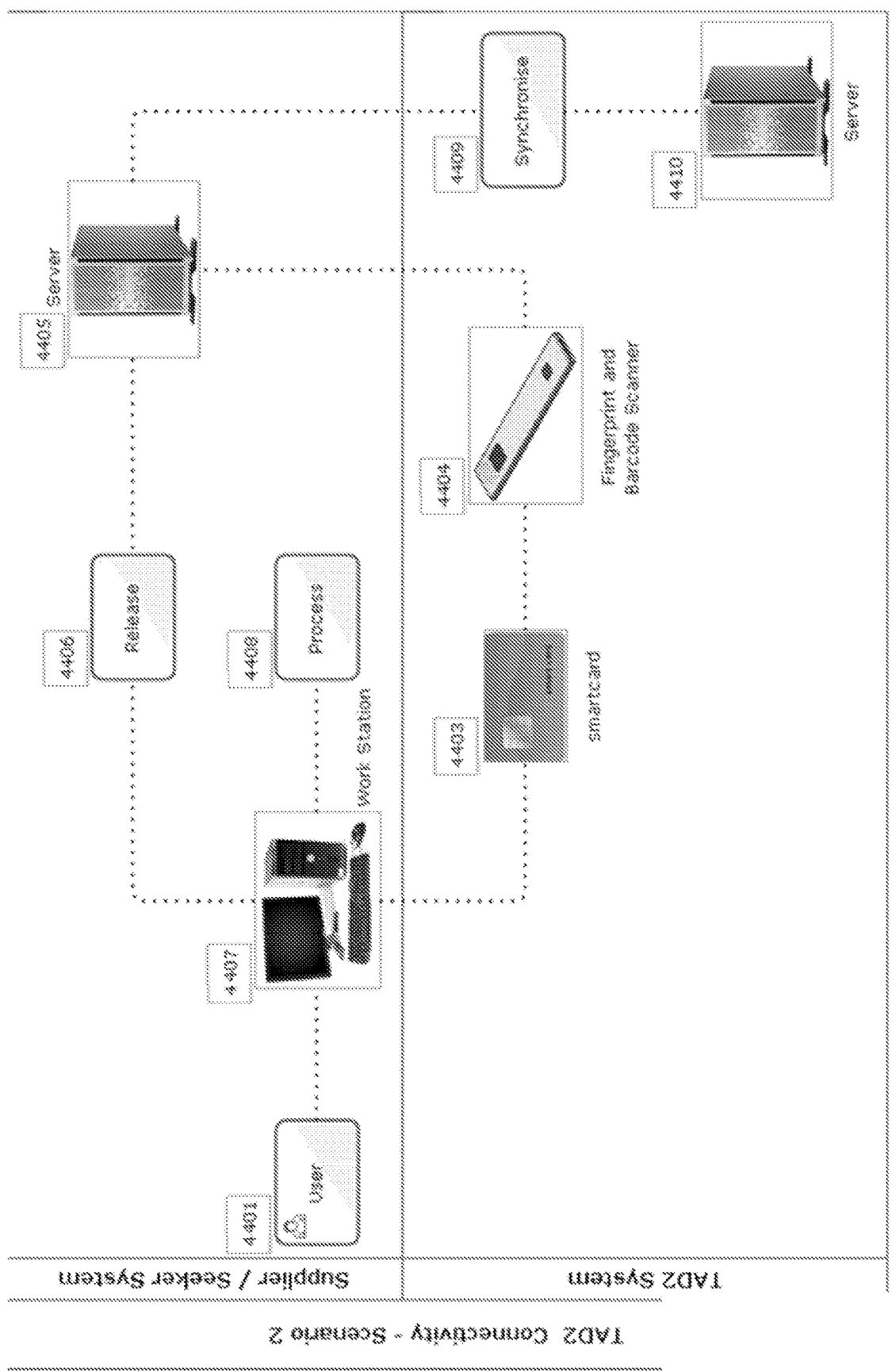
FIG. 18B is a schematic diagram which illustrates a second exemplary in-use scenario.

FIG. 18B is a flowchart which illustrates connectivity which may be implemented between a supplier/recipient system and a supply chain management system according to another embodiment. In this embodiment, the supplier/recipient work station interfaces with the supply chain management system for the entire process. The operator (4401) logs into the supplier recipient work station (4407), inserts his credential storage device (4403) and provides biometric information using the biometric capturing device (4404). The information is sent to the third party server computer (4405) which then releases (4406) the work station (4407) to do the required processes (4408). The data is synchronised (4409) between the third party server computer (4405) and the central server computer (4410).

Figure 18C:
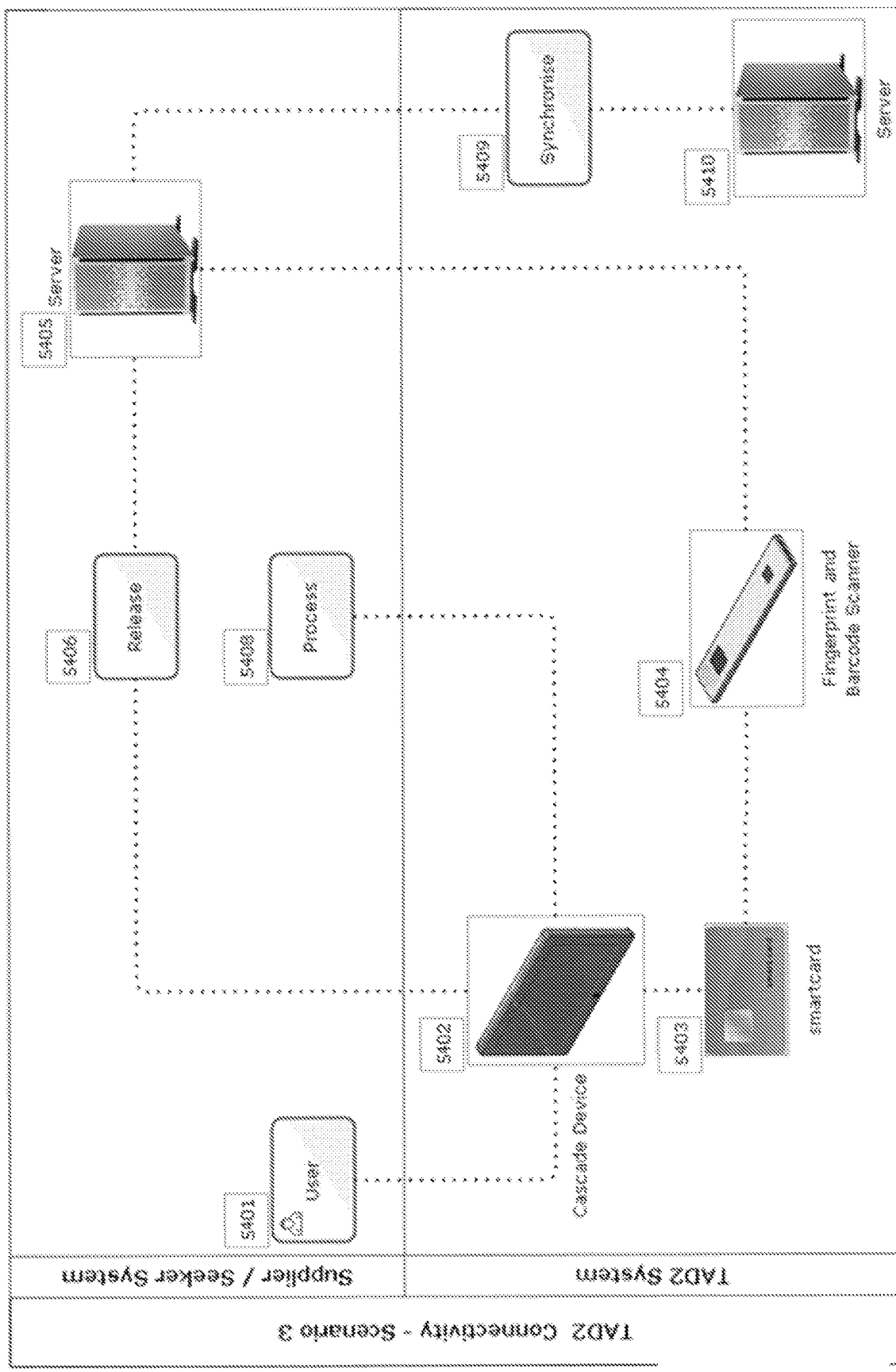
FIG. 18C is a schematic diagram which illustrates a third exemplary in-use scenario.

FIG. 18C is a flowchart which illustrates connectivity which may be implemented between a supplier/recipient system and a supply chain management system according to yet another embodiment. In this embodiment, the supply chain management device uses the supply chain management system for the entire process. The operator (5401) logs into the supply chain management device (5402), inserts his credential storage device (5403) and provides biometric information using the biometric capturing device (5404). The information is sent to the third party server computer (5405) which then releases (5406) the supply chain management device (5402) to do the required processes (5408). The data is synchronised (5409) between the third party server computer (5405) and the central server computer (5410).

Figure 19:
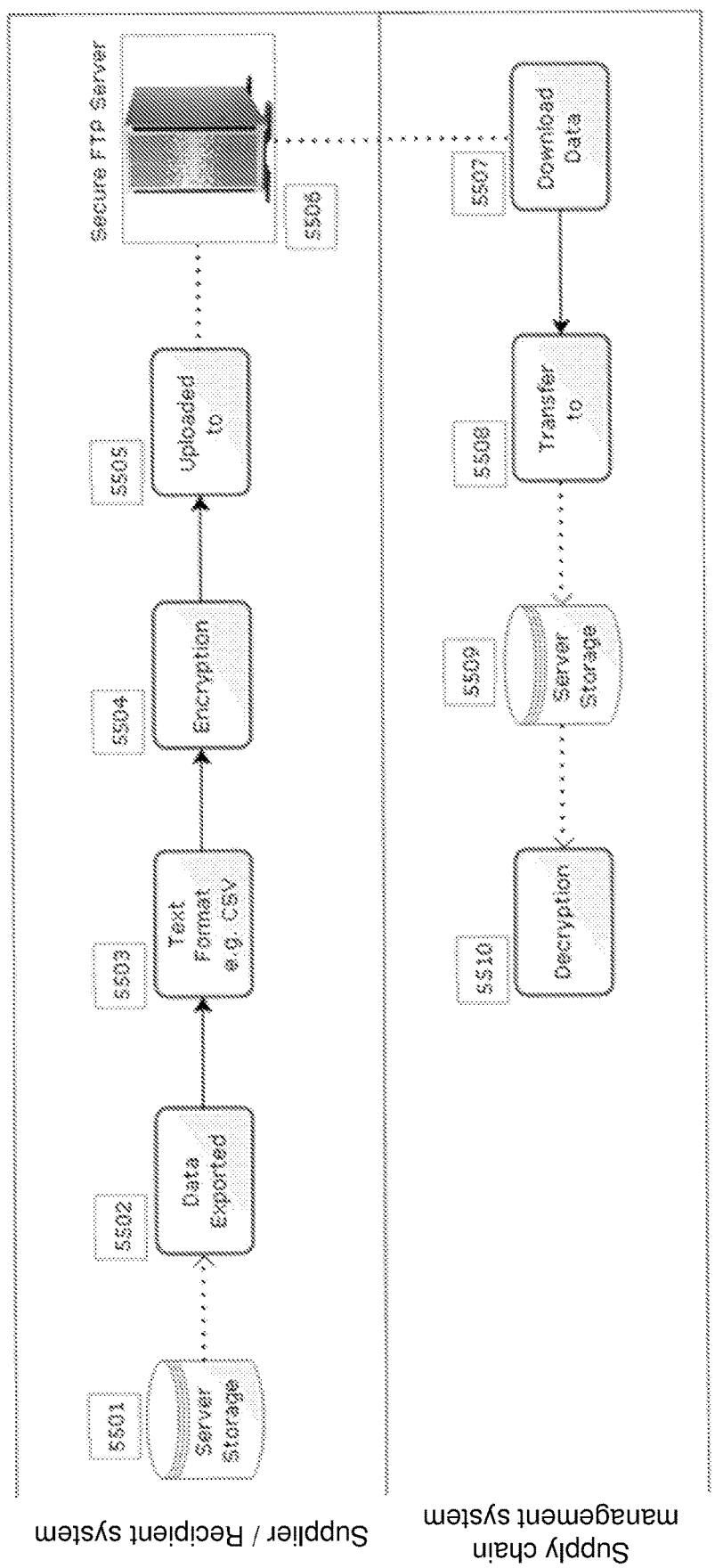
FIG. 19 is a schematic diagram which illustrates a method of synchronising data between a third party server computer and a central server computer.

FIG. 19 is a flow chart which illustrates method for synchronising data between a supplier/recipient system (e.g. a third party sever) and a supply chain management system (e.g. a central server). The supplier/recipient system server storage (5501) exports the data (5502) in a text format (5503). The resultant text file is encrypted (5504) and uploaded to (5505) a secure file transfer protocol (FTP) server (5506). The supply chain management system accesses the secure FTP server (5506) remotely and downloads (5507) the data. The data is transferred (5508) to a central server computer storage (5509) whereat the text file is decrypted (5510). Such an implementation described above with reference to FIG. 19 may require more resource management than process management. This may in turn require significantly less programming. In some cases, the synchronisation may take place at set intervals, e.g. hourly, daily, weekly, monthly, and the like. The intervals may be initiated or controlled by a recipient/supplier.

Figure 20:
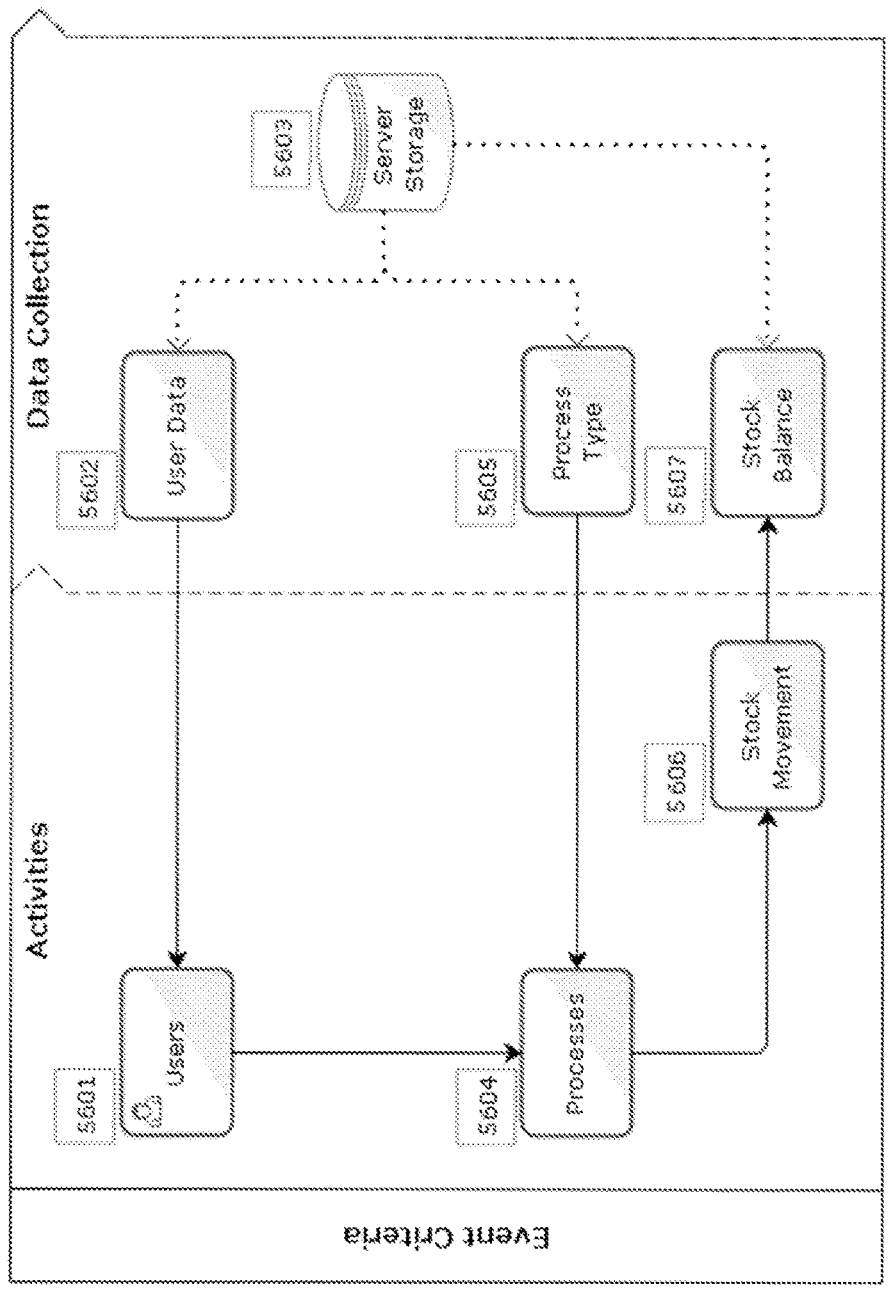
FIG. 20 is a flow chart which illustrates an exemplary event criteria of data collection.
Figure 21A:
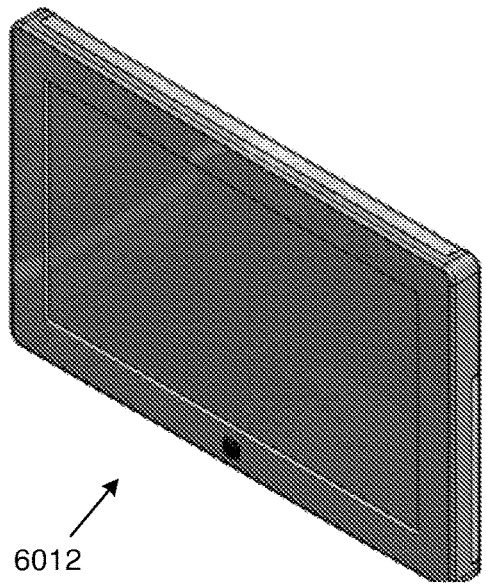
FIGS. 21A-21D illustrate an exemplary supply chain management device.
Figure 21B:
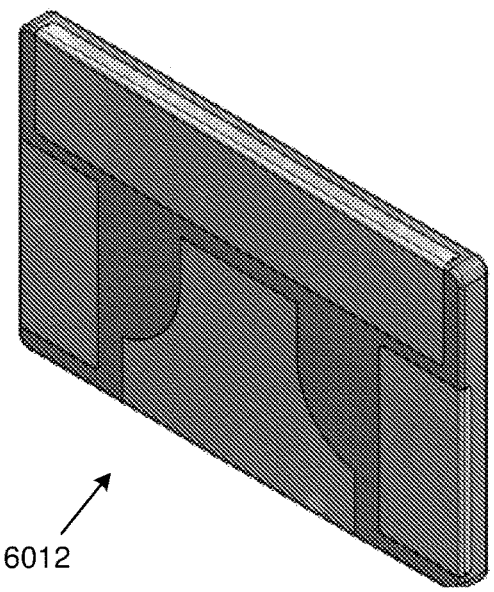
Figure 21C:
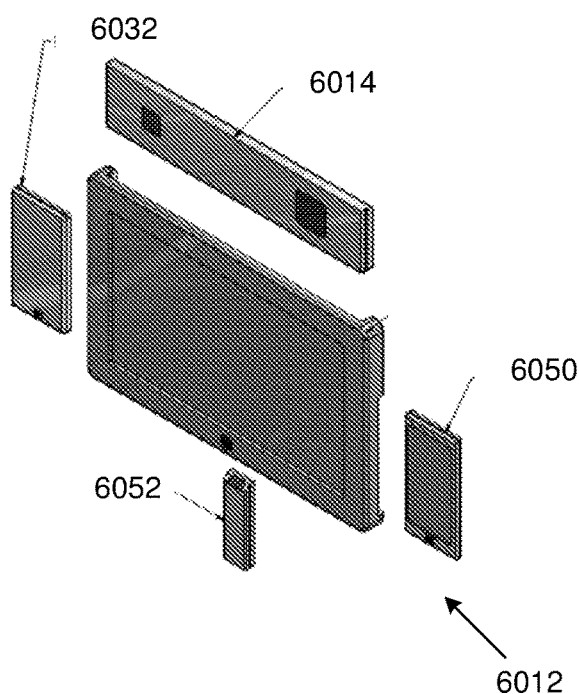
Figure 21D:
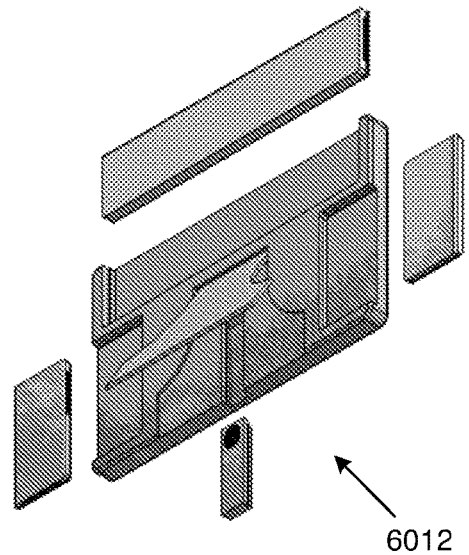

FIG. 20 is a flow chart which illustrates an exemplary event criteria of data collection. Operators (5601) may be the employees or contractors who fulfill the various processes (5604) of stock movement (5606). The operator data (5602) collects information including: operator name; operator position; operator authentication (e.g. credential storage device information, biometric information). This information is stored in the server (5603) storage database. The various processes (5604) done by the operators (5601) relating to stock movement (5606) that affect the stock balance (5607) include: invoicing stock out; credit notes stock out reversed; goods receiving stock in; debit notes stock in reversed; stock take stock adjustments; waste stock adjustments; spoilage stock adjustments; and, expired stock adjustments.

An example of what a text file may look like could be as follows:
Name, Position, Date, Time, ID authentication, Biometric authentication, Process, Description John Smith, Accounts Payable, 5 May 2015, 08:00 am, True, True, Goods Receiving, Stock In Pete Jones, Stores Controller, 16 May 2015, 11:15 am, True, true, Expired, Stock adjustments FIGS. 21A-21D illustrate various views of an exemplary supply chain management device (6012). The supply chain management device (6012) includes a portable device (6014) detachable from the supply chain management device (6012) and which includes a biometric capturing device, a credential storage device receiving module and a product identifying component. The supply chain management device (6012) also includes detachable transmitting component (6032), which may be in the form of a portable modem, and is operable to transmit data via one or more of the group of: a long range wireless area network (LoRAWAN), a satellite communication link; a cellular communication link such as a universal mobile telecommunications system (UMTS) link (e.g. 3G, 4G, LTE, etc.) and/or global system for mobile communications (GSM); a wired local area network; and a wireless local area network (e.g. Wi-Fi). In this manner, the supply chain management device may be operable in remote areas, even outside of the range of terrestrial-based communication networks. The supply chain management device (6012) further includes a portable electronic device (6050) and a portable product identifying device (6052), both of which are detachable from the supply chain management device.

FIGS. 22A-22D illustrate various views of an exemplary portable device (6014) which may be utilised in aspects of the disclosure. The portable device (6014) includes a biometric capturing device (6024), a credential storage device receiving module (6020) and a product identifying component (6026).

FIGS. 23A-23E illustrate various views of an exemplary portable product identifying device (6052), including a product identifying component, which may be utilised in aspects of the disclosure.

Figure 24A:
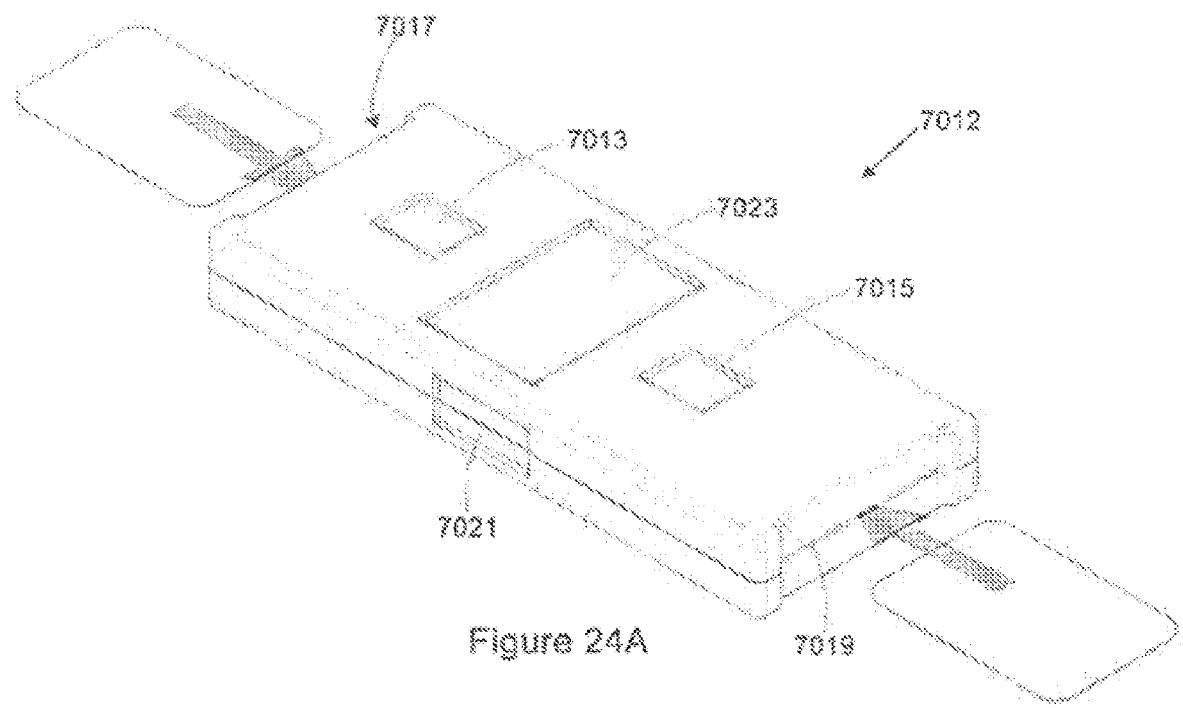
FIGS. 24A-24B illustrate an alternative supply chain management device.
Figure 24B:
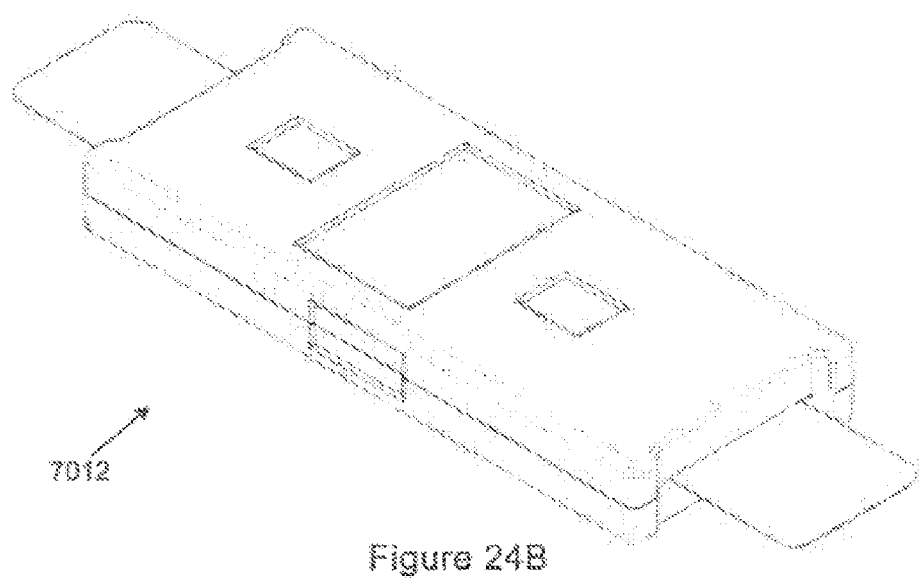

FIGS. 24A and 24B illustrates another embodiment of the supply chain management device 7012 including a pair of operator identifying modules 7013, 7015, in the form of biometric fingerprint or finger vein scanners, and a pair of secondary operator identifying modules 7017, 7019, in the form of card readers.

The supply chain management device 7012 further includes a product identifying component 7021, in the form of a barcode scanner, and a screen 7023. With the supply chain management device 7012 configured in this manner, a biometric and secondary identifier of each of the supplier and the recipient, as well as the identifier of the product can be obtained near simultaneously, and certainly within the predefined transaction time interval, constituting a virtual handshake.

It is envisaged that the invention will lend to what is trying to be achieved under legislation (or proposed legislation) in the United States of America and the European Union, namely The Drug Supply Chain Security Act and the Falsified Medicines Directive.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

Throughout the specification unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method for processing a transaction via a transaction device in communication with a server, the method including the steps of:
providing a supply chain management device comprising:
a product identifying device, the product identifying device including at least one of a barcode scanner and an RFID reader; and
an operator identifying device for identifying, at least one operator handling, a product, the operator identifying device comprising a biometric identifying component and a secondary identifying component, the product identifying device and the operator identifying device being disposed in a shared housing, the secondary identifying component including a first card reader configured to receive and read a first identification card of a supplier and a second card reader configured to receive and read a second identification card of a recipient;
obtaining, via the operator identifying device, an identifier of the at least one operator handling the product;
authenticating, via the operator identifying device, the at least one operator by using the at least one operator identifying device;
obtaining an identifier of the product using the product identifying device associated with the transaction device such that the identifier of the product is obtained with the step of obtaining the identifier of the at least one operator from both the biometric identifying component and the secondary identifying component while the first identification card of the supplier is received by the first card reader and the second identification of the recipient is received by the second card reader such that physical possession of the product by the at least one operator is tracked through a supply chain and inextricably links the operator and the product;

updating a record to associate the identifier of the at least one operator with the identifier of the product;

transmitting data from the transaction device to the server, the data including the identifier of the at least one operator and the identifier of the product;

performing the transaction if the step of obtaining the identifier of the product occurs within a predefined transaction time interval that is negligible; and cancelling the transaction if the step of obtaining the identifier of the product does not occur within a predefined transaction time interval that is negligible.

2. The method according to claim 1, wherein the updating of the record includes storing at least one of:
the identifier of the at least one operator; and
the identifier of the product in at least one of a digital storage of the transaction device and a credential storage device.

3. The method according to claim 1, wherein:
the data transmitted is operably encrypted.

4. The method according to claim 3, wherein:
the step of obtaining an identifier of the at least one operator includes obtaining an identifier from a credential storage device of the operator.

5. The method according to claim 4, wherein:
the step of authenticating the at least one operator includes:
obtaining biometric information from the at least one operator; and
comparing the obtained biometric information to biometric information stored on at least one of the transaction device and the credential storage device.

6. The method according to claim 5, wherein:
the at least one operator is a supplier of the product and further wherein the method includes the steps of:
obtaining an identifier of a recipient of the product; and, authenticating the recipient.

7. The method according to claim 6, wherein:
the step of obtaining the identifiers of the supplier and the product include obtaining within the predefined transaction time interval the identifier of the recipient.

8. The method according to claim 7, wherein:
the step of obtaining the identifiers of the supplier and the product further includes:
obtaining an identifier of a transaction device, the identifier of the transaction device being at least one of:
a unique number associated to such transaction device; and
a specific location of such transaction device at which the transaction device is located when the transaction is processed,
wherein the step of obtaining the identifiers is timed by a timing means.

9. The method according to claim 8, wherein:
the step of obtaining an identifier of a recipient includes obtaining an identifier from a credential storage device of the recipient; and the step of authenticating the recipient includes obtaining biometric information from the recipient and comparing the obtained biometric information to biometric information stored on the credential storage device of the recipient.

10. The method according to claim 9, wherein:
the step of obtaining an identifier of a transaction device includes obtaining an identifier from a credential storage device of the transaction devices; and
the step of authenticating the transaction device includes comparing the obtained transaction device identifier of a transaction device information stored on the credential storage device of the transaction devices.

11. The method according to claim 10, wherein:
the step of updating a record includes associating the identifier of the product with at least one of the identifiers of the supplier, the recipient and the transaction device.

12. The method according to claim 11, wherein:
the step of updating a record includes associating the identifier of the product with a status from a group of statuses including: product received; product dispensed; product sold; and product returned.

13. The method according to claim 12, wherein:
the step of obtaining an identifier of the product includes a step of authenticating the identifier of the product thereby to authenticate the product.

14. The method according to claim 13, further comprising:
a step of associating a successful transaction with the identifier of the product such that a downstream transaction is allowable only upon successful completion of an upstream transaction.

15. The method according to claim 14, further comprising:
a step of receiving diagnostic information relating to the recipient, wherein the diagnostic information is capable of being inputted by the at least one operator and for the received diagnostic information to be stored on the credential storage device of the recipient.

16. The method according to claim 15, wherein the step of receiving diagnostic information includes receiving such information from a credential storage device of the recipient.

17. The method according to claim 16 further comprising:
based on the received diagnostic information, identifying a product to be provided to the recipient; and responsive to identifying the product, granting permission for release of the identified product.

18. The method according to claim 17 further comprising:
a step of determining whether the identified product is available; and: (i) if the identified product is available, granting permission for release of the identified product, and (ii) if the identified product is not available, identifying an alternative operator able to release the identified product.

19. The method according to claim 18, wherein the step of updating a record to associate the identifier of the at least one operator with the identifier of the product further includes associating the identifier of the at least one operator with additional information, the additional information includes one or more of:
biometric information of the at least one operator, supplier and/or the recipient; a time at which the identifier of the product was obtained;
a time at which the identifier of the at least one of the at least one operator, supplier and the recipient was obtained;

diagnostic information; and at least one of a time at which the at least one operator, supplier and/or the recipient was authenticated; the date and time of concluding the transaction; and the monetary amount associated with the transaction.

* * * * *